United States Patent [19]

Schmider

[11] Patent Number: 4,568,847
[45] Date of Patent: Feb. 4, 1986

[54] COLLECTOR-TYPE D.C. MACHINE WITH IMPROVED CONNECTIONS AMONG COLLECTOR SEGMENTS AND COILS

[75] Inventor: Fritz Schmider, Hornberg, Fed. Rep. of Germany

[73] Assignee: Papst-Motoren GmbH & Co KG, St. Georgen, Fed. Rep. of Germany

[21] Appl. No.: 522,049

[22] Filed: Aug. 10, 1983

[30] Foreign Application Priority Data

Aug. 10, 1982 [DE] Fed. Rep. of Germany ....... 3229744
Nov. 5, 1982 [DE] Fed. Rep. of Germany ....... 3240826
Jul. 8, 1983 [DE] Fed. Rep. of Germany ....... 3324617

[51] Int. Cl.$^4$ .............................................. H02K 3/28
[52] U.S. Cl. .................................. 310/268; 310/62 R; 310/208; 310/237
[58] Field of Search ................. 310/68 R, 40, 46, 198, 310/220-222, 233, 234, 237, 268, 269, DIG. 6, 202, 203, 68, 208; 318/439

[56] References Cited

U.S. PATENT DOCUMENTS

| Re. 25,305 | 12/1962 | Haydon | 310/237 |
|---|---|---|---|
| Re. 30,761 | 10/1981 | Ban et al. | 310/202 |
| 3,487,246 | 12/1969 | Long | 310/154 |
| 3,686,521 | 8/1972 | Henry-Baudot | 310/46 |
| 4,082,971 | 4/1978 | Miyake et al. | 310/268 |
| 4,093,882 | 6/1978 | Furuta | 310/268 |
| 4,107,587 | 8/1978 | Ban et al. | 318/439 |
| 4,188,556 | 2/1980 | Hahn | 310/268 |
| 4,336,475 | 6/1982 | Morinaga et al. | 310/268 |
| 4,369,388 | 1/1983 | Ban et al. | 310/154 |

FOREIGN PATENT DOCUMENTS

| 1054554 | 9/1959 | Fed. Rep. of Germany . |
|---|---|---|
| 2211184 | 9/1972 | Fed. Rep. of Germany . |
| 2635297 | 8/1975 | Fed. Rep. of Germany . |
| 2650510 | 5/1977 | Fed. Rep. of Germany . |
| 2853318 | 6/1979 | Fed. Rep. of Germany . |
| 2853319 | 7/1979 | Fed. Rep. of Germany . |
| 33692 | 5/1967 | German Democratic Rep. . |
| 55-37885 | 3/1980 | Japan . |
| WO80/02088 | 10/1980 | PCT Int'l Appl. . |
| WO82/02803 | 8/1982 | PCT Int'l Appl. . |
| 1059793 | 2/1967 | United Kingdom . |
| 1166597 | 10/1969 | United Kingdom . |
| 1169935 | 11/1969 | United Kingdom . |

Primary Examiner—Peter S. Wong
Assistant Examiner—D. L. Rebsch
Attorney, Agent, or Firm—Theodore J. Koss, Jr.

[57] ABSTRACT

A small motor having a planar air gap has a rotor comprising a rotor shaft journalled in a carrier pipe of small diameter at whose outer periphery are mounted shape-retaining rotor coils which are cantilevered out into the air gap. This provides a rotor of very small axial moment of inertia, affording very short start-up times. Furthermore, the coils are subjected to very good cooling action. Such a motor is suitable especially for signal-recording or -reproducing apparatus. The arrangement of the rotor coils is symmetrical and yields a very simple and compact motor construction.

25 Claims, 23 Drawing Figures

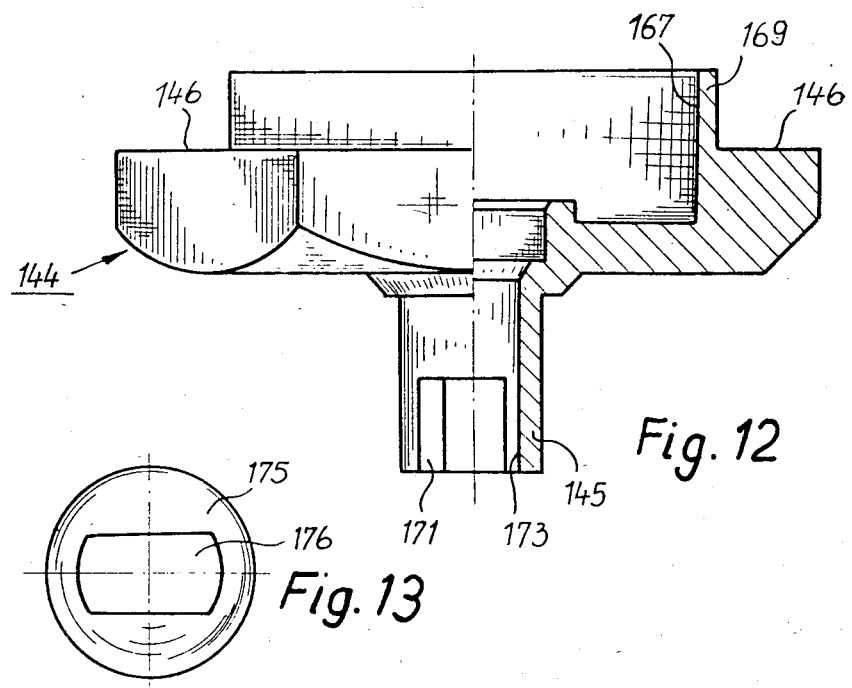
Fig. 12
Fig. 13
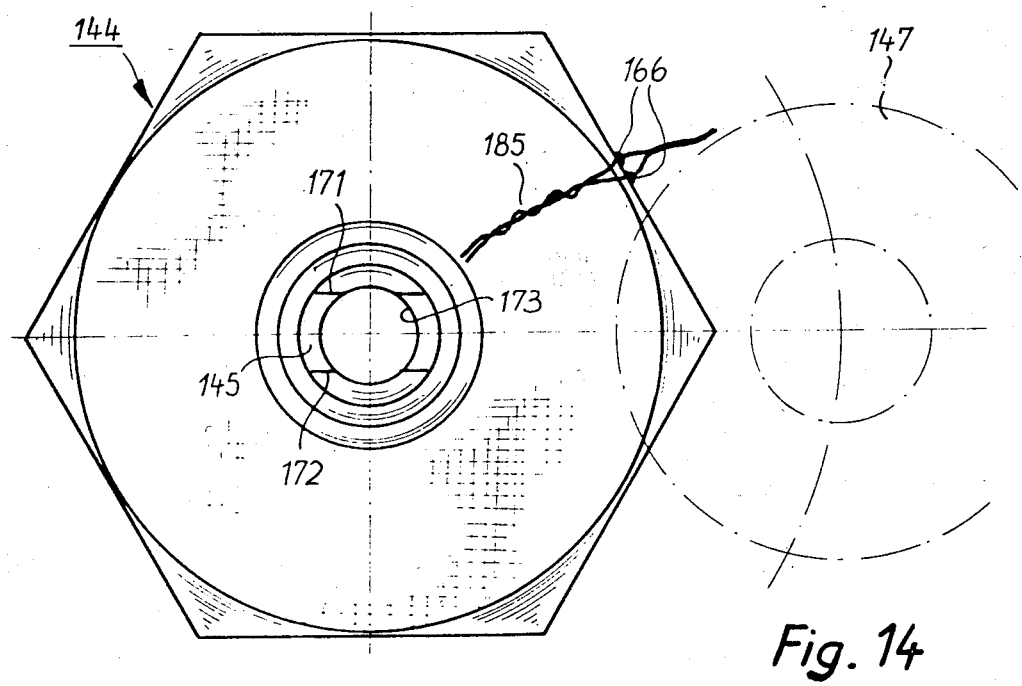
Fig. 14

COLLECTOR-TYPE D.C. MACHINE WITH IMPROVED CONNECTIONS AMONG COLLECTOR SEGMENTS AND COILS

BACKGROUND OF THE INVENTION

The present invention concerns collector-type D.C. machines, either motors or generators, having a multipole stator magnet arrangement and an ironless rotor winding comprising a plurality of rotor coils lower in number than the number of stator poles, the rotor coils being arranged as a single-layer winding, with the collector of the machine comprising collector lamellas of which predetermined ones are electrically interconnected by cross-connecting means. Such a machine is disclosed, for example, in commonly owned Federal Republic of Germany patent application No. P 32 17 283.4.

SUMMARY OF THE INVENTION

It is the general object of the invention to improve and simplify motors of such type, as well as their manufacture.

In the preferred embodiment of the invention, the stator has eight poles and the rotor winding six coils, the rotor comprising a collector formed by twelve collector lamellas. Means are provided for transmitting current to and from the collector lamellas and for connecting together respective ones of the lamellas, such means including first and second brush arrangements angularly offset from each other by 45+n×90 mechanical degrees, wherein n=0, 1, 2 or 3, such means furthermoreincluding cross-connecting means operative for causing the collector lamellas of a respective collector lamella group to be electrically connected together as successive collector lamella groups are engaged by the first and second brush arrangements, each collector lamella group consisting of a respective four collector lamellas spaced one from the next at angular intervals of 90 mechanical degrees. The six rotor coils are arranged as three coil-pairs, the two coils of each pair being located diametrically opposite each other and being connected in series with each other, the first, second and third coil-pairs being, respectively, electrically connected between collector lamellas of the first and second collector lamella groups, between collector lamellas of the second and third collector lamella groups, and between collector lamellas of the third and first collector lamella groups. Preferably, the cross-connecting means comprise first, second and third cross-connecting means provided on the rotor arrangement, each cross-connecting means permanently electricaly connecting together the four collector lamellas of a respective one of the first, second and third collector lamella groups.

With such a construction one obtains, with a good copper packing factor, a simple manner of production, since only a few connecting operations are required to establish the few electrical connections to the collector. This is particularly of advantage in the case of miniature motors, such as the present invention preferably concerns; such motors typically have powers lower than 10 watts. Also, such motor construction exhibits a symmmetrical rotor configuration and, all in all, an extremely compact structure.

According to a preferred concept of the invention, the constituent rotor coils of the rotor winding are formed by a single, uninterrupted conductor which is wound without break from one coil to the next, reducing the number of wires which need be connected to the collector.

In many cases a low axial moment of inertia of the rotor is desired, for example in order to assure quick motor start-up. According to a further concept of the invention, the rotor coils are mounted on the rotor at their radially innermost parts and extend out from there in cantilevered and self-supporting fashion. In this way, the axial moment of inertia of the rotor is determined substantially exclusively by the inherent weight of the rotor coils themselves. At the same time, the rotor coils are surrounded by air on all sides and thus experience a particularly good cooling action, so that they may be safely subjected to rather high thermal loading.

The invention furthermore contemplates particularly convenient ways of fabricating the collector, but these will be best understood after detailed consideration of the collector structures involved.

In addition to the objects and advantages stated above, further objects and advantages will become apparent from the description of specific embodiments when read in connection with the accompanying Figures.

BRIEF DESCRIPTION OF THE DRAWING

FIG. 12 is a partially sectioned side view of the carrier member of the motor construction of FIG. 11;

FIG. 13 depicts a molded rotation-transmitting member of the machine of FIG. 11;

FIG. 14 is an end view of the carrier member of FIG. 12, additionally showing, in dash-dot lines, the position of a rotor coil, and furthermore showing the location of connecting wires;

DESCRIPTION OF THE PREFERRED EMBODIMENTS

Figure 1:
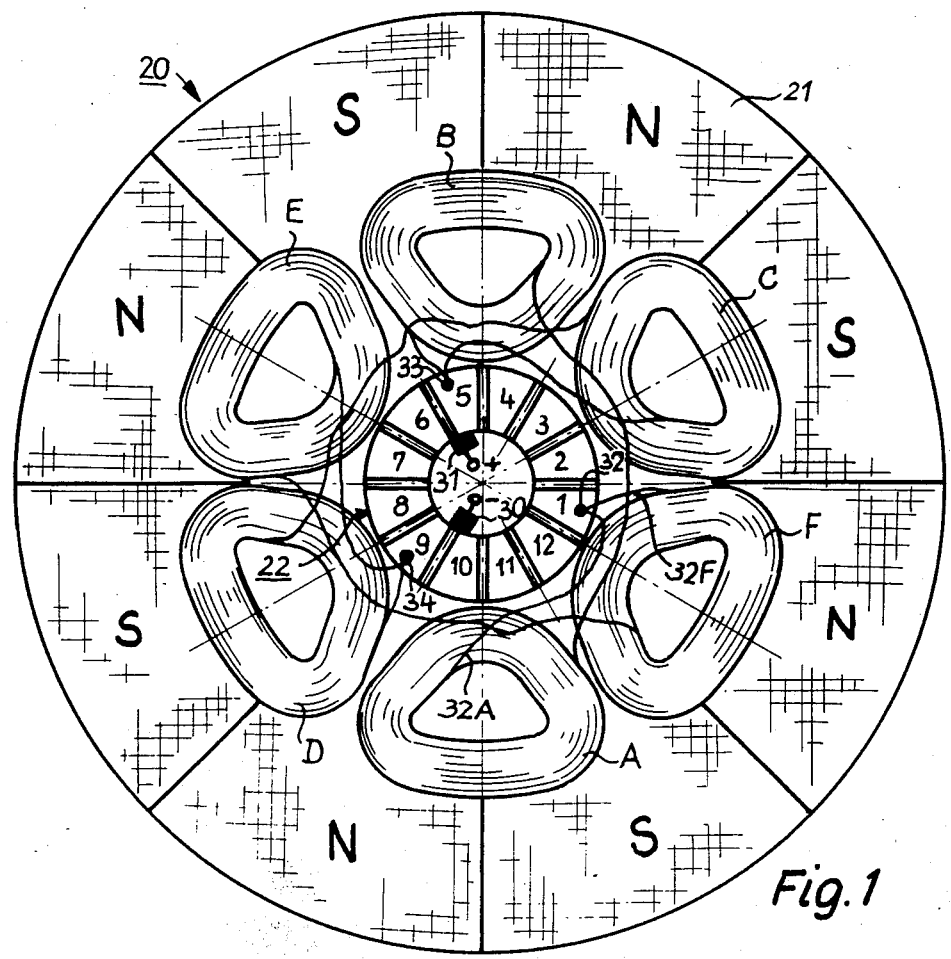
FIG. 1 schematically depicts a first embodiment of the inventive machine, here with a flat air gap, an eight-pole stator magnet, a rotor comprising six equiangularly arranged rotor coils, and a collector having twelve collector lamellas.

In the various Figures identical or corresponding elements are denoted by identical reference numerals. Terms such as "upper", "lower", "left", "right", etc., refer to the orientation of a particular structure as depicted in a particular Figure. To impart a notion of typical true scale, a "1 cm" length designation appears in various Figures, but the exact dimensions of particular depicted structures can of course be larger or smaller.

FIG. 1 is a schematic plan view of a first embodiment of a machine 20 according to the invention, in this instance a machine having a flat air gap, FIG. 1 being in particular a view taken along a section plane parallel to the air gap. Depicted area a collector 22 having twelve collector lamellas 1-12, six rotor coils A-F and, behind the latter, a stator magnet 21 which, as shown, has eight poles and is axially magnetized. Typically, the stator magnet may be a one-piece annular member polarized in the illustrated manner, and whose plot of induction versus angular location along the circumferential direction of the stator magnet has the shape of a trapezoid wave. However, the stator magnet could alternatively comprise, for example, an assembly of discrete magnet segments. The radial extent of the stator magnet ring is such as to cover the magnetically active sections of the rotor coils A-F, i.e., the portions of the latter extending generally in a radial direction. FIG. 1 depicts the stator magnet ring extending radially outward to an exaggerated degree, beyond the radially outer periphery of the set of six rotor coils, merely to facilitate visualization of the angular extents of the successive stator poles.

Figure 2:
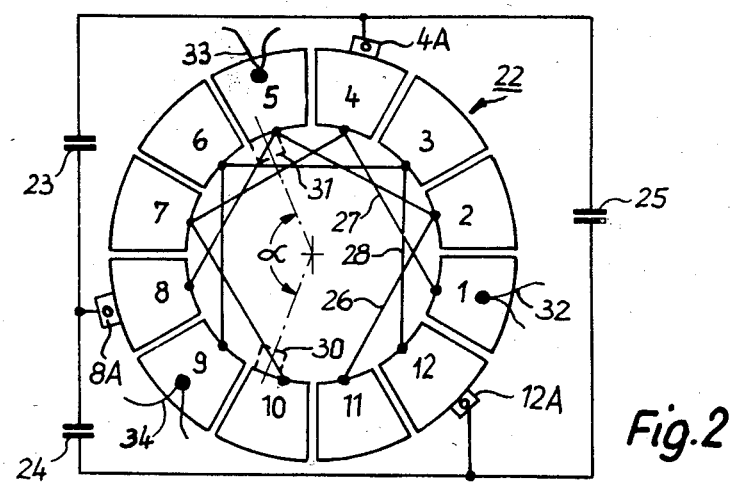
FIG. 2 schematically depicts the collector of FIG. 1, including three cross-connecting means and anti-interference capacitors.

FIG. 2 depicts, in a likewise very schematic manner, the electrical interconnections as among constituent elements of the collector 22, in this instance depicted as a generally planar collector; it will be appreciated, however, that other collector geometries could be employed. Of the twelve collector lamellas 1-12, lamellas 4, 8 and 12 are each provided with a respective bent-up conductive tab 4A, 8A, 12A. As will be explained below, the bent-up conductive tabs 4A, 8A, 12A serve as electrical contacts which form conductive connections to an anti-interference circuit module; the latter comprises three identically dimensioned capacitors or condensors 23, 24, 25 as shown in FIG. 2. Capacitor 23 is connected between conductive tabs 4A and 8A; capacitor 24 between tabs 8A and 12A; capacitor 25 between tabs 12A and 4A.

As shown in FIG. 2, the twelve collector lamellas 1-12 are electrically interconnected by three cross-connecting means, as follows:

A first cross-connecting means 26 electrically connects together the four collector lamellas 2, 5, 8, 11 of a first collector lamella group.

A second cross-connecting means 27 electrically connects together the four collector lamellas 1, 4, 7, 10 of a second collector lamella group.

A third cross-connecting means 28 electrically connects together the four collector lamellas 3, 6, 9, 12 of a third collector lamella group.

In the instance depicted in FIG. 2, the set of twelve collector lamellas is thus subdivided into three collector lamella groups, each constituted by a respective four collector lamellas, the four lamellas of one group being spaced from one another at intervals of 90 mechanical degrees.

Two brushes 30, 31 are employed to transmit current to and from collector lamellas 1-12. The brushes 30, 31 are not located diametrically opposite each other. Instead, one brush, e.g., brush 30, is mounted on the stator beneath a north pole segment of stator magnet 21, and the other brush, i.e., here brush 30, beneath a south pole segment, the angular spacing $\alpha$ between the two brushes being $45+n\times 90$ mechanical degrees, where $n=0, 1, 2$ or 3.

It is to be noted that, as an alternative to the rotor-mounted cross-connecting means 26, 27, 28, equivalent cross-connections could be established by using, instead of one brush 30 and one brush 31, two sets of brushes, each set of brushes being constituted by four brushes, the four brushes of one set being angularly offset by about 45 mechanical degrees from the four brushes of the other set. In such case, the four brushes of one set of brushes would be electrically connected to one another, and the four brushes of the other set would be electrically connected to one another.

In this first embodiment, the set of six rotor coils A-F is provided with a total of only three external connection points 32, 33, 34 and these are, as shown, electrically connected to respective ones of the three collector lamellas 1, 5, 9. In this respect, reference is made to FIG. 3, which illustrates the manner in which the six coils A-F are fabricated as a continuous-conductor chain of coils. As will be clear from a comparison of FIGS. 1 and 3, the six rotor coils A-F are organized as three coil-pairs A, B; C, D; and E, F. The two coils of each coil-pair A, B or C, D or E, F are located diametrically opposite to each other, relative to the rotor rotation axis.

Figure 3:
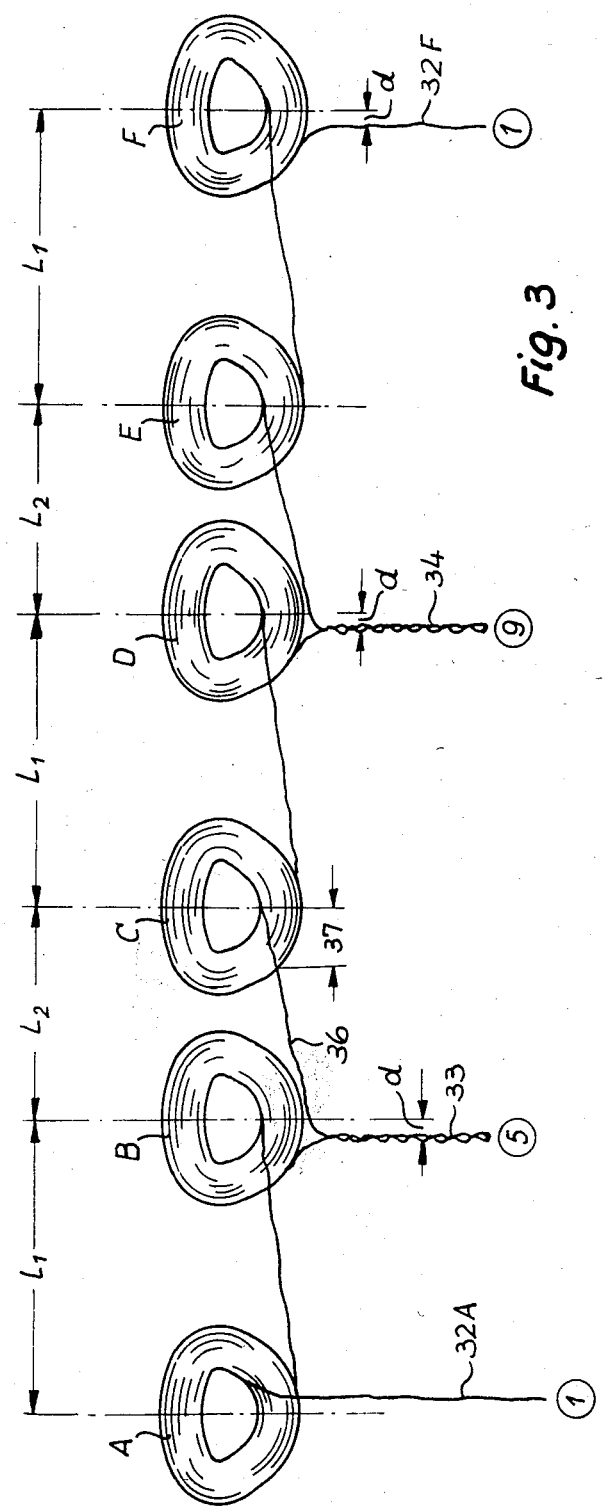
FIG. 3 depicts the rotor winding of FIG. 1, strung out to show the manner in which the six rotor coils can be fabricated using only a single conductor which proceeds without break from one coil to the next.

As shown in FIG. 3, in this embodiment the six rotor coils A–F may be wound from a single conductor which extends without break from one coil to the next. The single conductor, in addition to the portions forming the six coils per se, comprises transitional portions which extend from one coil to the next. These transitional portions are either inter-coil transitional portions which extend a distance $L_1$ from one coil of a coil-pair to the other coil of the same coil-pair, or else inter-coil-pair transitional portions which extend a distance $L_2$ from a coil of one coil-pair to a coil of a neighboring coil-pair. As shown, the inter-coil spans $L_1$ are greater than the inter-coil-pair spans $L_2$. The ratio $L_1:L_2$ can preferably be on the order of 3:2 or 4:3.

As shown in FIG. 3, the inter-coil-pair transitional portions of the constituent conductor each extend first from a coil of one coil-pair to a respective connection point (at 33 or 34 or 32) and then from such connecting point to a coil of an adjoining coil-pair. The connection point 32A, 32F, is electrically connected to collector lamella 1. Connecting point 33 is electrically connected to collector lamella 5. Connection point 34 is electrically connectd to collector lamella 9. As will be appreciated from FIG. 1, each of the six coils A–F is symmetrical with regard to a respective symmetry plane which passes through the rotor rotation axis, and the three connection points 32, 33, 34 are spatially located near to adjoining coils but angularly offset by a distance d (see FIG. 3) relative to the symmetry plane of the respective coil. As indicated in FIG. 3, all six coils A–F have the same winding sense.

During assembly of the machine, e.g. the rotor coil A may be secured at a location where its symmetry plane coincides with the radial line of separation between collector lamellas 10 and 11, as shown in FIG. 1, with coil B then being located diametrically opposite. Then coil C of FIG. 1 is secured adjoining coil B, with the symmetry plane of coil C coinciding with the line of separation between collector lamellas 2 and 3, with coil D being then positioned diametrically opposite coil C. Then coil E is secured in place alongside coil D, with the symmetry plane of coil E coinciding with the line of separation between collector lamellas 6 and 7, as shown in FIG. 1, and coil F is then secured in place diametrically opposite to coil E. Electrical connection of the connecting points 32, 33, 34 to respective collector lamellas has already been described.

Naturally, the connection point 32A, instead of being connected to collector lamella 1, could equivalently be connected to any of lamellas 4, 7 or 10, since the four collector lamellas 1, 4, 7, 10 are anyway electrically connected together by the second cross-connecting means 27. Thus, expressed in another way, in the illustrated embodiment the coil connecting point 32 is electrically connected to the second cross-connecting means 27; the coil connection point 33 to the first cross-connecting means 26, and the connection point 34 to the third cross-connecting means 28. Expressed yet another way, the three series circuits A–B, C–D, E–F are connected in delta configuration between the three cross-connecting means 26, 27, 28.

As will be apparent from the above description, the fabrication of the six rotor coils A–F, by virtue of their formation from a single, uninterrupted, continuously wound conductor, is very simple, and likewise simple is their assembly and their electrical connection to collector 22; these are extremely simple and suitable for automated performance, especially as only three soldering or welding operations are required. Because of the offset d of the individual connection points 32, 33, 34, there automatically results the correct positioning of the coil ends relative to the associated collector lamellas.

The individual rotor coils are preferably fabricated with a cementing or binding lacquer or varnish causing the coils to be inherently shape-retaining, so that they may be mounted, as described below, in a self-supporting or cantilevered fashion. Where the aforementioned transitional portions of the constituent conductor cross the coils, such lacquer or varnish is absent. For example, the transitional portion 36 (FIG. 3) extending from coil B to coil C is not provided with such lacquer or varnish along segment 37; the same is true in similar fashion for the other coils. In assembled condition of the machine, the transitional portions of the rotor coils' constituent conductor are located beneath the collector, where they can be securely cemented.

Figure 4:
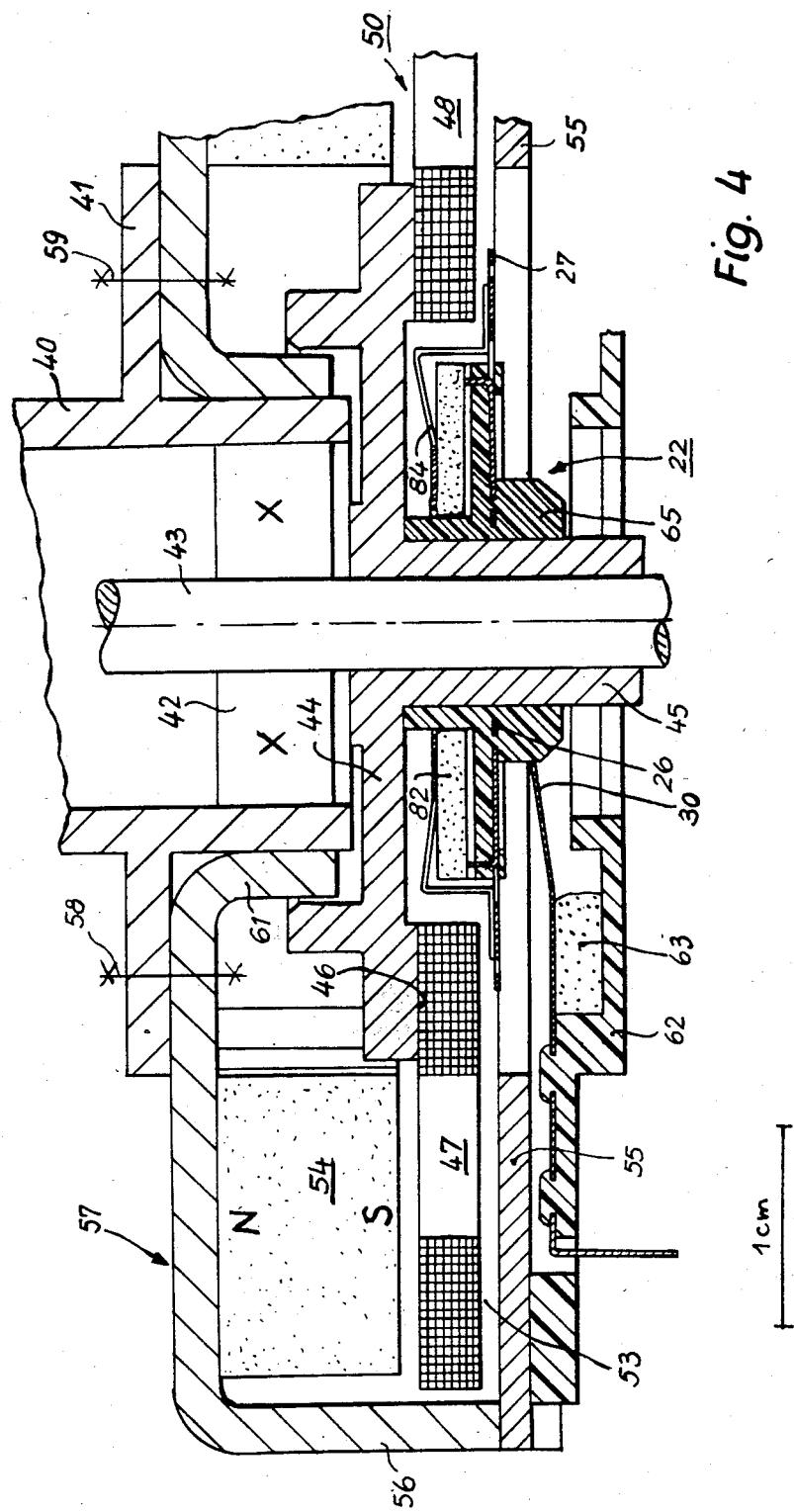
FIG. 4 is a longitudinal section through a preferred embodiment of a motor having the rotor-coil and stator-magnet arrangement of FIG. 1, depicted at a greater than true scale.

FIG. 4 depicts on a greatly enlarged scale a preferred embodiment of the mechanical construction of such a machine, in this instance a drive motor for the capstan of a signal-recording device for video signals. This device comprises a carrier pipe 40 with a mounting flange 41. A motor shaft 43 is journalled in roller bearings in carrier pipe 40, only one roller bearing unit 42 being illustrated. A carrier member 44 made of a non-magnetic material, e.g. aluminum, is secured at a hub portion 45 to the motor shaft 43. Secured to the underside 46 of carrier member 44, e.g. by means of cement, are the radially inward portions of the rotor coils A–F, of which two are illustrated in FIG. 4 and denoted 47 and 48, the remaining portions of the rotor coils extending radially outward therefrom in cantilevered fashion. The carrier member 44 can for example having an external diameter of 4.4 cm, while the overall circular outer periphery of the set of six rotor coils may have a diameter of about 7.8 cm. In this way, the axial moment of inertia is determined for the most part only by the six rotor coils themselves. Accordingly, the axial moment of inertia (the so-called $GD^2$) of such a rotor 50 is very small and, at the same time, the individual coils 47, 48 experience a very effective cooling action and thus can be safely subjected to high thermal loading.

The rotor coils 47, 48 freely extend radially outward, with their magnetically active segments projecting into a flat air gap 53 formed between a stator magnet ring 54 and an annular flux-return or yoke plate 55 made of iron. As shown in FIG. 1, the stator magnet ring 54 has eight poles and is axially magnetized. The yoke plate 55 is held in place, by magnetic attractive force, against the edge of the outer peripheral wall 56 of an annular channel-like stator housing 57. The stator housing 57 is a deep-drawn sheet-steel part and accommodates in its interior the magnet ring 54, which latter is cemented in place. Stator housing 57 is secured to mounting flange 41 at locations 58, 59 by any appropriate conventional means and, as shown in FIG. 4, has an inner peripheral wall 61 which is centered on the carrier pipe 40.

Secured to the bottom face of yoke plate 55 is a molded part 62 made of electrically insulating material. Insulating member 62 mounts the two brushes 30, 31, of which only brush 30 is (in part) visible in the sectional view of FIG. 4. The brush 30 is secured at the base portion thereof to a damping mass 63 which serves to attenuate mechanical oscillations of the elongated body of the brush. The collector 22 is secured on the hub portion 45 of the carrier member 44. The collector 22 comprises a hub member 65 made of electrically insulating material in which are embedded the radially inner portions of the collector lamellas 1–12. The construction and manner of production of the collector 22 and its embedding hub member 65 will be explained below in greater detail in conjunction with FIGS. 5–10.

Figure 8:
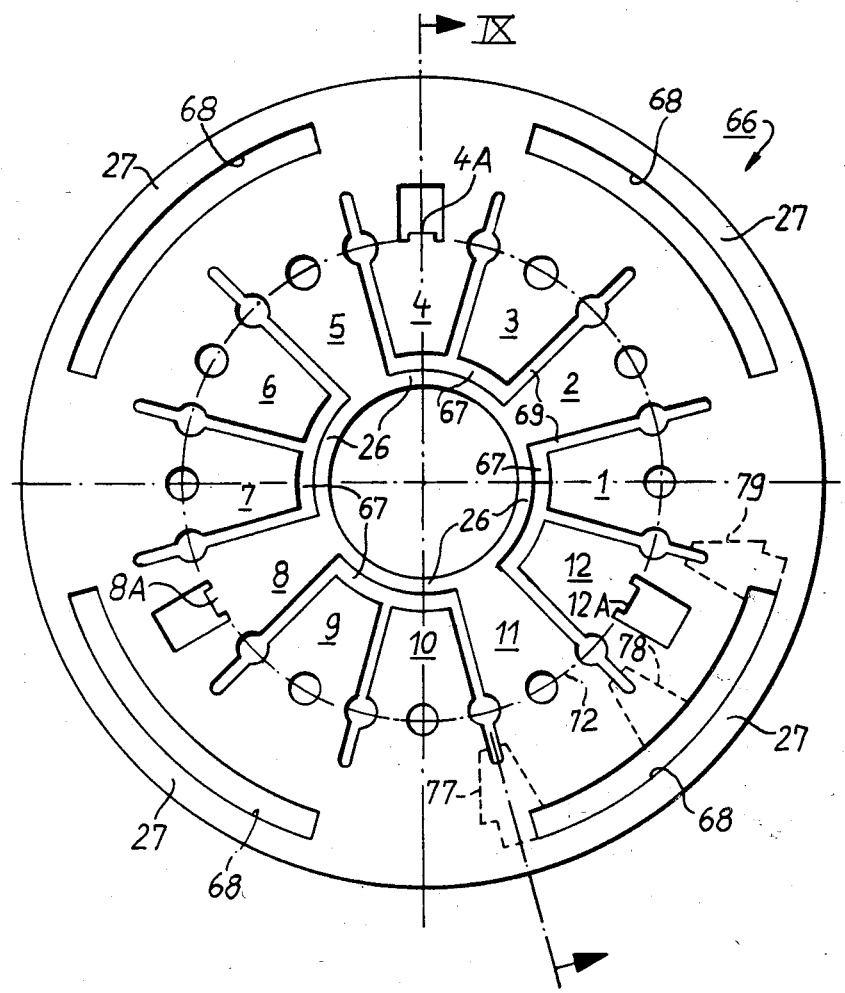
FIG. 8 depicts a collector blank at an earlystage of fabrication of the collector, seen from the brush side, with an orientation corresponding to that of FIG. 5.

In fabricating the collector 22, one commences with a sheet-metal blank 66 which has been stamped out to have the configuration depicted in FIG. 8. As shown in FIG. 8, at this stage of fabrication the twelve collector lamellas 1–12 are still all electrically interconnected with one another. The first cross-connecting means 26, however, is already present in the stamped blank of FIG. 8, and as shown electrically connects together the collector lamellas 2, 5, 8, 11 at the radially inner portions thereof; the first cross-connecting means 26 is already electrically separated from the other eight collector lamellas by virtue of arcuate cut-outs 67. The bent-up conductive tabs 4A, 8A, 12A schematically depicted in FIG. 2 are already present on the stamped-out blank of FIG. 8 in bent-up condition (as better seen in FIG. 9, described below). The tabs 4A, 8A, 12A are located radially outward of the circular zone swept over by the brushes 30, 31.

Figure 9:
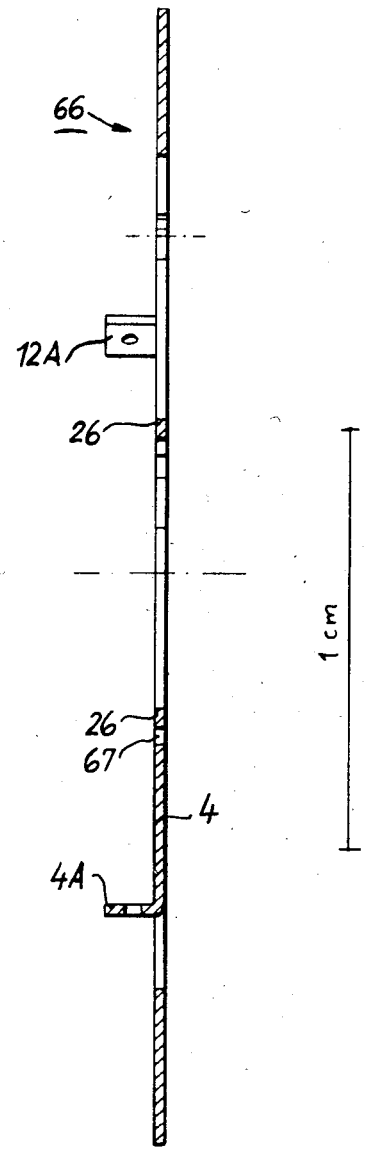
FIG. 9 is a section through the collector blank of FIG. 8, taken along line IX—IX of FIG. 8, the orientation of the blank being upside-down in FIG. 9 compared to FIG. 8.

FIG. 9 is a section through the stamped-out blank 66 of FIG. 8, taken along line IX—IX. It is noted that in FIG. 9 the blank 66 is shown upside-down with respect to its depiction in FIG. 8; thus, in FIG. 8 tab 4A appears above tab 12A, whereas in FIG. 9 tab 12A appears above tab 4A. The orientation of the blank as depicted in FIG. 8 corresponds, however, with the orientation of the blank as viewed in FIG. 5 (yet to be described).

In the stamped-out blank 66 of FIG. 8, the second cross-connecting means 27 is present only in rudimentary form, to the extent of four arcuate cut-outs 68 located radially outward of the operative range of the brushes. In the circular zone in which the brushes will sweep across the collector lamellas 1–12, the collector lamellas are, in the stamped-out blank of FIG. 8, already separated one from the next by radial gaps 69. The radial lamella-separating gaps 69 extend radially outward past a circle 72 and, in the region of circle 72, have enlarged portions. The bent-up conductive tabs 4A, 8A, 12A are likewise located on the circle 72.

Figure 5:
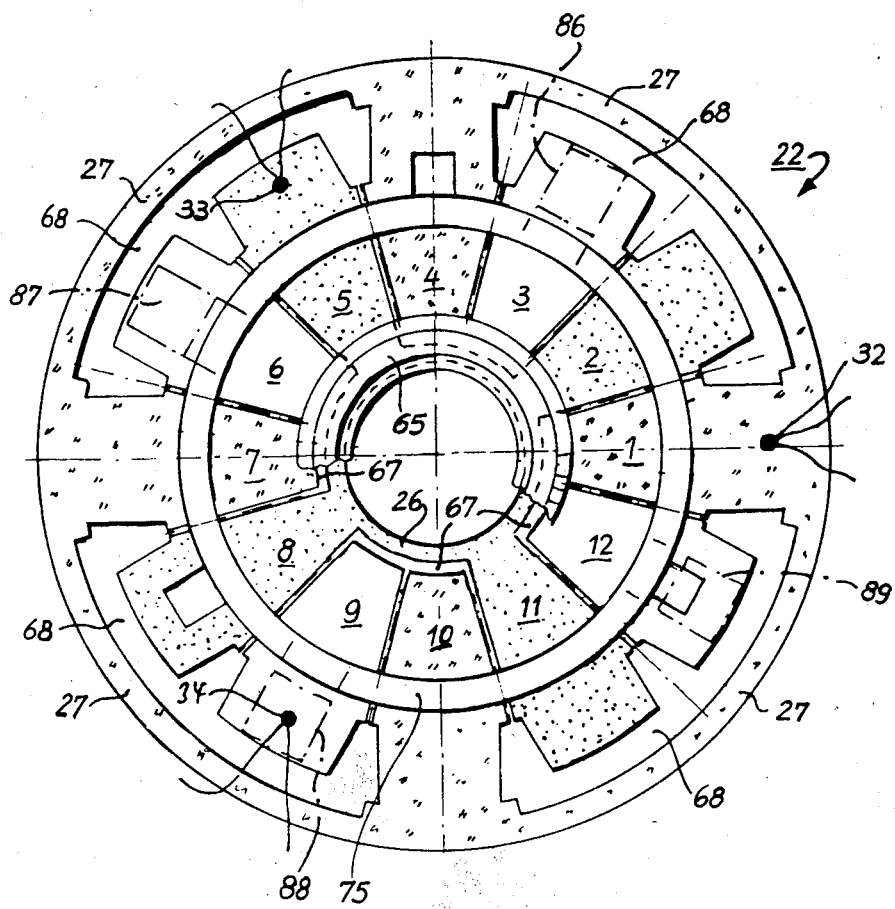
FIG. 5 is a plan view of the collector of the motor of FIG. 1, seen from the brush side, at enlarged scale, with certain parts of the structure broken away to facilitate visualization.
Figure 10:
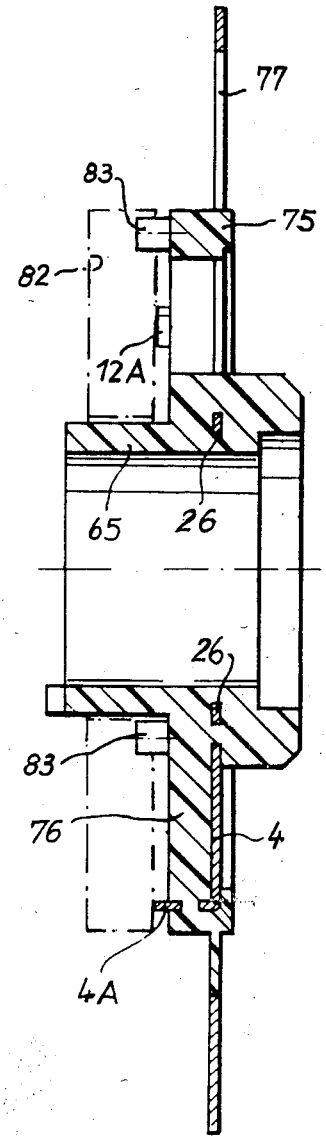
FIG. 10 is a view of the collector blank as shown in FIG. 9, in finished state, embedded in a molded body of insulating material, an anti-interference circuit module being shown in position in dash-dot lines.

After fabrication of the collector blank 66 of FIGS. 8 and 9, the blank is embedded in a molded body of synthetic plastic material, preferably a polyamide, the molded body having the form shown in FIG. 10 and, in plan view, in FIG. 5. As shown in FIG. 10, such molded body has a central hub portion 65 which completely envelops the first cross-connecting means 26, completely fills the aforementioned arcuate cut-outs 67, and entirely envelops and embeds the radially inner portions of the collector lamellas 1–12. In the vicinity of circle 72 (cf. FIGS. 8, 10 and 5) the molded insulating member comprises a ring portion 75 which is located to both axial sides of the collector blank 67 and, in this vicinity, envelops the collector lamellas from both sides; the material of ring portion 75 passes through the enlarged portions of the radial gaps 69 (FIG. 8) at the region of circle 72, and likewise passes through the circular apertures located intermediate adjoining enlarged portions of the gaps 69. Spoke-like portions 76 extend integral from the radially inner hub portion 65 to the ring portion 75.

After the stamped-out collector blank 66 has been thusly embedded in insulating material, it is then subjected to a further stamping procedure, serving to complete the fabrication of the second cross-connecting means 27, such that the latter be electrically continuous only with the collector lamellas 1, 4, 7, 10. One example of the way in which this may be accomplsihed can be seen in FIG. 8. As shown in FIG. 8, further cut-outs 77, 78, 79 may be stamped out to extend the three associated radial gaps 69 out to the associated arcuate cut-out 68. This serves to electrically separate the two collector lamellas 11, 12 from the second cross-connecting means 27. Three further sets of such cut-outs 77, 78, 79 are likewise formed, to electrically separate the second cross-connecting means 27 from the two collector lamellas 2, 3, from the two collector lamellas 5, 6, and from the two collector lamellas 8, 9. When this further stamping-out procedure has been completed, the radially outward zone of the collector blank will now have the appearance shown in FIG. 5.

The first group of four collector lamellas 2, 5, 8, 11 are continuous only with the radially inward first cross-connecting means 26, and this first continuous area from the original blank is shown in FIG. 5 hatched in by tiny dots.

The second group of four collector lamellas 1, 4, 7, 10 are continuous only with the radially outward second cross-connecting means 27, and this second continuous area formed from the original blank is shown in FIG. 5 hatched in by short fleck-like straight lines.

The third group of four collector lamellas 3, 6, 9, 12 (not hatched in FIG. 5) are, at this stage of fabrication, discontinuous from one another and discontinuous from all the remainder of the original blank. The third cross-connecting means 28, which electrically connects these four lamellas together, is yet to be provided in a manner described below.

Before that, it is to be noted (FIG. 10) that the three bent-up conductive tabs 4A, 8A, 12A, already described, project axially out of the insulating ring portion 75 and are spaced angularly by 120° (FIG. 8). The three tabs 4A, 8A, 12A are employed as electrical contacts and electrically engage three electrical contacts of an annular anti-interference circuit module 82. The annular module 82 may for example be a cast or molded synthetic plastic body whose interior accommodates the three anti-interference capacitors 23, 24, 25 of FIG. 2. The insulating ring portion 75 is provided with three integral centering pins 83 which serve to center the annular circuit module 82. The three centering pins 83 are received in recesses in the axial end face of the annular housing of module 82, to positively define the position of the circuit module. However, the right end face (as viewed in FIG. 10) of the circuit module 82 axially bears only against the three bent-up contact tabs 4A, 8A, 12A, in order to establish a purely three-point support against the contact tabs; this assures that electrical engagement will be reliably established and maintained with the three contact tabs.

Figure 6:
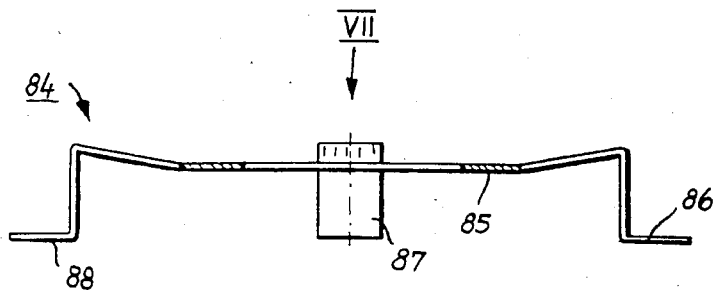
FIG. 6 is a section, taken along line VI—VI of FIG. 7, through a spring element which serves to press an anti-interference circuit module into position against the collector, and which furthermore serves as a cross-connecting means interconnecting four collector lamellas.
Figure 7:
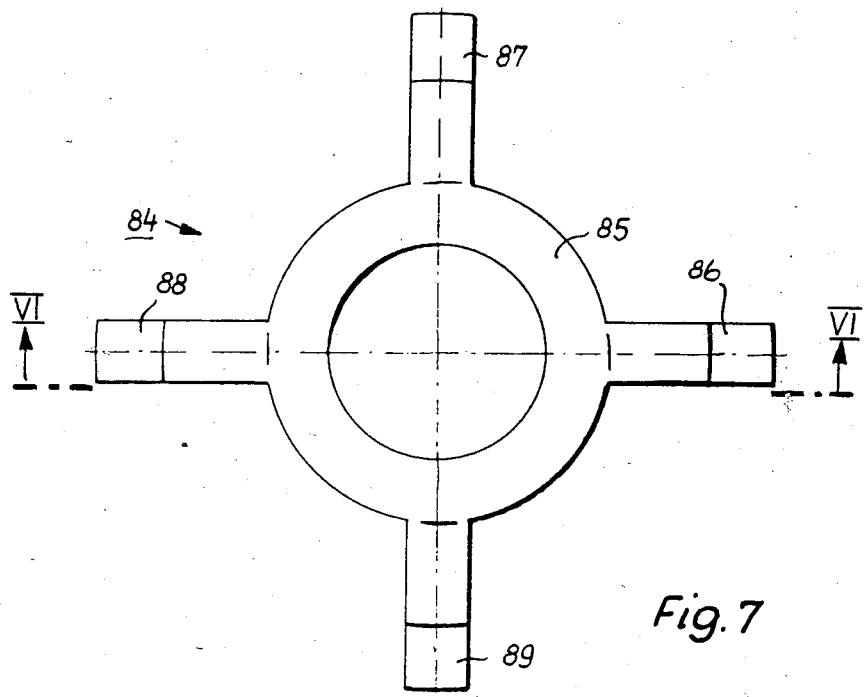
FIG. 7 is a plan view of the spring element of FIG. 6, seen along line VII of FIG. 6.

The annular circuit module 82 is axially pressed against the tabs 4A, 8A, 12A by means of a spring member 84 shown mounted in place in FIG. 4, and shown separately in FIGS. 6 and 7. Spring member 84 has a central annular portion 85 which encircles hub member 65 (FIG. 4). The central portion 85 bears axially against the anti-interference circuit module 82, pressing the latter against the conductive tabs. Extending radially outward from central portion 85 are four identical spoke-like spring arms 86, 87, 88, 89 of somewhat Z-shaped configuration. The free ends of these four spring arms are planar and extend approximately parallel to the plane of the central annular portion 85.

This spring member 84 is simultaneously employed as the third cross-connecting means 28. As shown in FIG. 5, the planar ends of the four spring arms 86, 87, 88, 89 are each permanently welded to a respective one of the four collector lamellas 3, 6, 9, 12 of the third collector lamella group, electrically interconnecting them. The welding location is as shown radially outward of the insulating ring portion 75.

As shown in FIG. 5, the connection points 32, 33, 34 for the rotor coil-pairs are respectively connected, e.g., by soldering, to the collector lamellas 1, 5, 9, radially outward of the insulating ring portion 75.

From the foregoing description, it will be appreciated that the collector arrangement depicted in FIG. 5 constitutes an extraordinarily compact structure whose fabrication can be performed with a remarkably low number of operations. The span of the coils is as illustrated preferably greater than 180 electrical degrees. Sector-shaped coils such as here illustrated are preferred, but circular coils could likewise be employed.

If it should be desired to replace the three cross-connecting means 26, 27, 28 by brushes, then in addition to brush 31 three further such brushes must be provided, respectively offset relative to it by 90°, by 180° and by 270° and all electrically connected to brush 31. Likewise, in addition to brush 30 three further brushes would be required, likewise offset relative to it by 90°, 180° and 270° and all electrically connected to brush 30.

Self-evidently, the collector 22 can have an angular position relative to the coils A–F other than the one illustrated, provided that the brushes 30, 31 are likewise shifted by such angle. The spacing d of FIG. 3 will then have a different magnitude, and could also be of zero magnitude.

The illustrated motor has a power consumption of 0.6 W and at 1500 rmp produces a torque of 0.2 Ncm (20 cmp), and is a miniature motor which supplies a torque of very good constancy with a very low axial moment of inertia.

Figure 11:
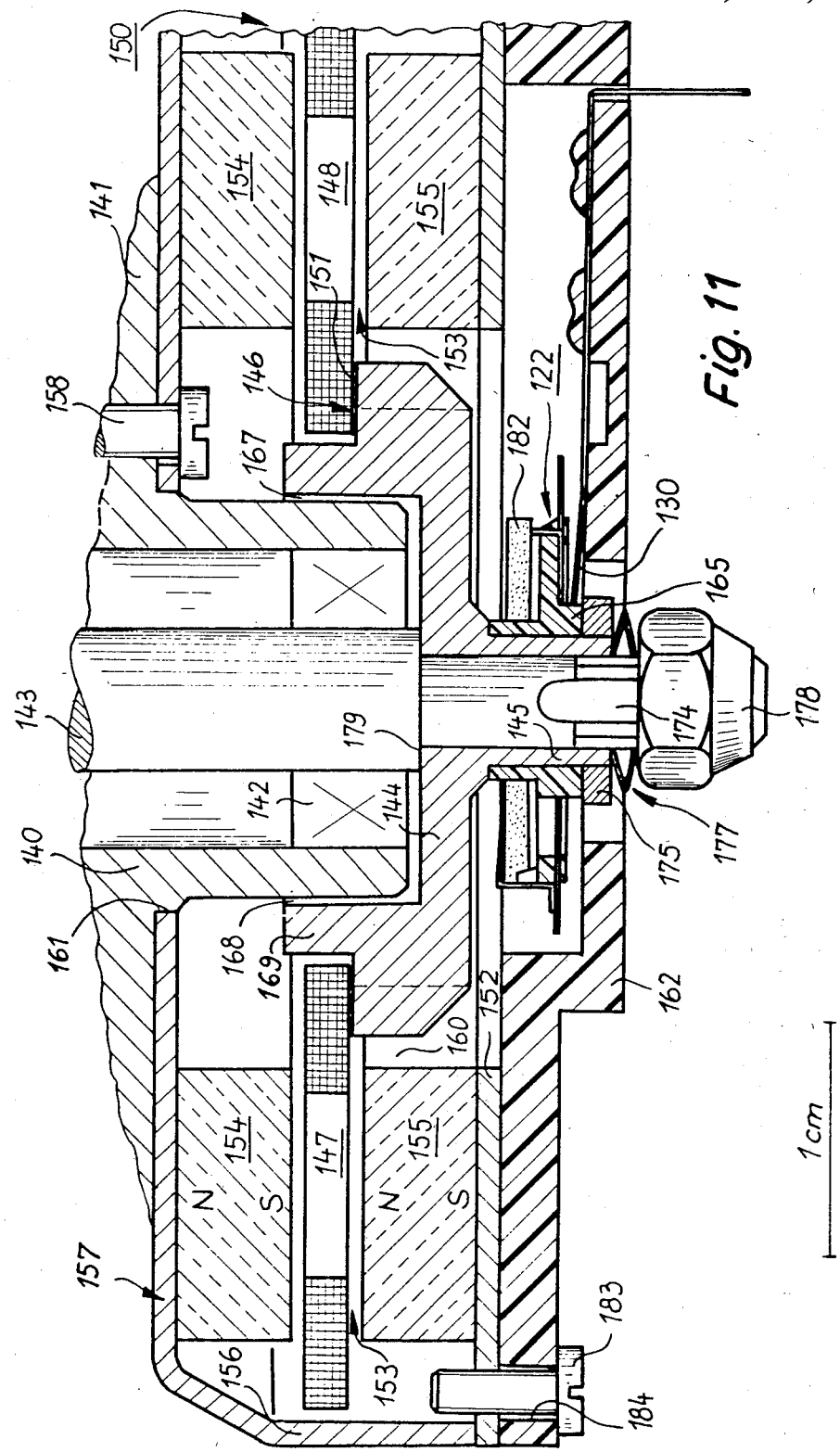
FIG. 11 is a longitudinal section like that of FIG. 4 but of a second embodiment of an inventive collector-type D.C. machine of symmetrical construction, a portion of the structure at the left side being removed to facilitate visualization, the depiction being at about four times typical true scale.

FIG. 11 depicts, at a scale considerably greater than typical true scale, a second embodiment of the invention, here a drive motor for a signal-recording device for video signals. This device comprises a carrier pipe 140 with a radial mounting flange 141. A motor shaft 143 is journalled in roller bearings accommodated within the carrier pipe 140, only one roller bearing unit 142 being illustrated. A carrier member 144 of non-magnetic material, e.g. aluminum or a suitable synthetic plastic, is secured to the motor shaft 143 at an axial extension 145 of the carrier member 144. The rotor coils 147, 148 (cf. FIG. 16) are secured at their radially inward portions to a peripheral stepped face of the carrier member 144 by means of cement; e.g. as illustrated by means of a thin fabric layer 151 impregnated with epoxy resin. The carrier member 144 can have an outer diameter of e.g. 2.8 cm. whereas the circular arrangement of six rotor coils (cf. FIG. 16) has a general outer periphery having a diameter of 5.7 cm, i.e., the axial moment of inertia is determined substantially exclusively by the six rotor coils per se, so that the rotor 150 has a very small $GD^2$ value, while at the same time the individual rotor coils 147, 148 experience very good cooling action and can be safely subjected to high thermal loading.

The coils 147, 148 extend with their magnetically active sections into a flat air gap 153 formed between an upper stator magnet ring 154 and a lower stator magnet ring 155. The two stator magnet rings 154, 155 are axially magnetized and each of eight poles. An annular flux-return or yoke plate 152 made of iron carries magnet ring 155 and is held, by magnetic holding force, against the rim of the outer peripheral wall 156 of a cup-like stator housing 157. Stator housing 157 is a deep-drawn sheet-steel part, and the upper magnet ring 154 it accomodates is cemented in place. The stator housing is secured by means of screws 158 to a flange 141 and, as illustrated, is at its radially inner rim 161 centered on the carrier pipe 140.

Secured to the bottom face of yoke plate 152 by means of screws 183 is a molded member 182 made of electrically insulating material and mounting two brushes, of which only the brush 130 is visible in FIG. 11. The screws 183 extend through apertures 184 in the molded insulating member 182. The apertures 184 are, if viewed axially of the motor, of elongated or arcuate extent, permitting angular shifting of the member 162 relative to the rotor axis of the motor, i.e., before tightening of screws 183; this makes it possible during assembly to establish an optimum position for the brushes 130 relative to the stator magnet rings 154, 155.

Figure 16:
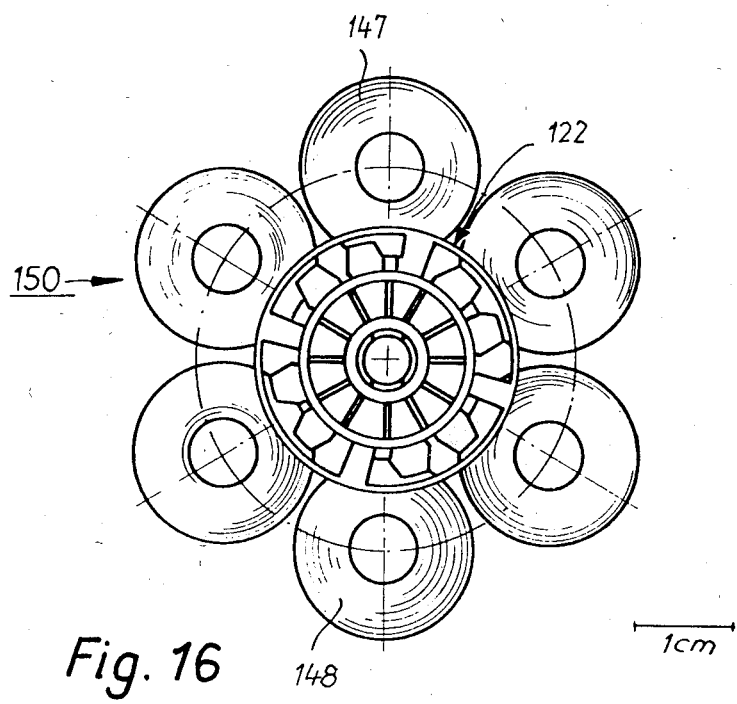
FIG. 16 is a view of the structure of FIG. 15 seen from below.

A collector 122 of planar geometry is mounted on the axial extension 145 of the carrier member 144. The collector 122 includes a hub member 165 made of electrically insulating material which securely embeds the radially inward ends of the collector's twelve collector lamellas. The collector 122 may be of the same construction, and fabricated in the same way, as already described with respect to FIGS. 5–10. Likewise, the eight-pole magnetization of the magnet rings 154, 155 may be the same as already described with reference to FIG. 1. Also, the arrangement of the rotor coils and their electrical connections to one another and to the collector lamellas may be the same as already described with regard to FIGS. 1–3. As shown in FIG. 16, the rotor coils may here be circular, and fabricated with cementing or binding varnish or lacquer, to impart to the coils shape-retaining properties permitting them to be mounted in cantilevered or self-supporting manner; of course, use could alternatively be made of one or more discrete coil carrier members, although the illustrated cantilevered mounting of the rotor coils is preferred.

Located above the collector 122 is an annular anti-interference circuit module 182 containing three capacitors, whose manner of connection is shown in FIG. 2 as is also the arrangement of collector brushes.

As furthermore shown in FIG. 11, the carrier member 144 has a maximum outer diameter which is smaller by only about 2 mm than the inner diameter of the magnet ring 155 which encircles it, so that the gap 160 between the lower magnet ring 155 and the outer periphery of the carrier member 144 amounts to only about 1–1.5 mm. So small a gap is important, in order that there be provided in the vicinity of the magnetically active sections of coils 147, 148 a magnetic field of the greatest possible homogeneity.

If now the connecting lines for the coils 147, 148 were to be led through this narrow gap 160, then during assembly or later repairs the connecting lines could easily become wedged in the gap, and thereby be badly damaged or destroyed. For this reason, as shown in FIGS. 12 and 14, the carrier member 144 is of non-circular configuration at its outer periphery. In particular, the carrier member 144 is of greatest radius at those locations where a coil 147 is to be secured; between such locations it is of somewhat reduced radius, so that at such locations the connecting lines 185 for the collector 122 can be fed through and fixed in place by means of cement, or the like, at a location such as indicated in FIG. 14 at 166.

At its inner periphery 167 the carrier member 144 encircles the carrier pipe 140, forming a long and very narrow gap 168, so that grease or oil from the bearings 142 cannot migrate through this narrow gap to the collector 122, and thus not interfere with proper operation of the collector. To this end, the carrier member 144 is provided at its upper face with a relatively long collar-like extension 169.

The lower axial extension 145 of carrier member 144 is, as shown in FIGS. 11 and 12, provided with two flattened portions 171, 172 which extend to the inner opening 173 provided for the shaft 143. Shaft 143 is likewise provided with two corresponding flattened portions, of which in FIG. 11 only the flattened portion 174 is visible. A molded part 175 (FIG. 13) has an internal opening 176 which is complementary to these flattened portions. As shown in FIG. 11, molded part 175 is fitted onto the axial extension 145 and connects the latter with the shaft 143 for joint rotation therewith. Two dish springs 177 are provided, one bearing against a nut 178 screwed onto the lower end of shaft 143, the other bearing on the axial extension 145; the dish springs accordingly press the carrier member 144 upwards against a shoulder 179 on the shaft 143, establishing a definite axial position for the carrier member 144. This same construction is employed in the case of the third embodiment, yet to be described.

Figure 15:
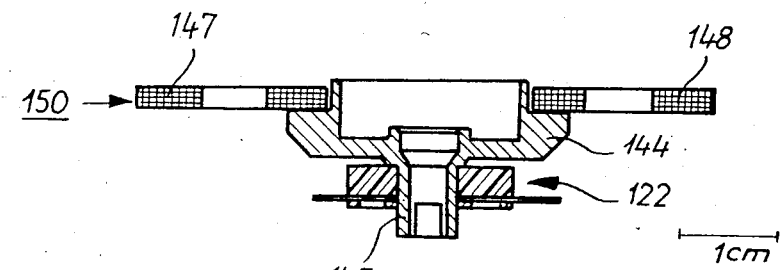
FIG. 15 depicts the carrier member of FIGS. 12 and 14 with the rotor coils and collector mounted in place.

FIGS. 15 and 16 depict the carrier member 144 when the collector 122 and the six rotor coils are in assembled and mounted condition. The scale of the illustration is here likewise slightly larger than typical true scale. One can appreciate the very compact construction of the rotor 150 and its small axial moment of inertia, which makes possible very quick start-up of the motor in response to energization.

At an operating voltage of 10 V, the illustrated motor has a current consumption of 55 mA at 1500 rpm and rated load (i.e., the load presented by the driven capstan). The type of motor here involved is a miniature motor exhibiting good efficiency, achieved with very compact construction. Tests have shown that such motors can be expected to have a very long service life.

FIGS. 17-23 depict a third embodiment of a D.C. machine according to the invention, here in the form of a miniature motor 200 which, as shown has an axial thickness of about 8 mm and a diameter of about 40 mm, and is thus extremely compact. This motor has a current consumption of about 180 mA at a D.C. voltage of 10 V at rated power, and at 1500 rpm produces a torque of about 0.2 Ncm (starting torque 0.95 Ncm). Because of its extremely small dimensions, the motor 200 is illustrated at a considerably enlarged scale, especially in FIGS. 19-23. To facilitate appreciation of the correspondence between the scale of those Figures and that of FIGS. 17 and 18, a "1 cm" scale indication is provided for all those Figures. Motor 200 serves for example as the drive motor for a video-signal signal-recording device. A carrier structure 239 has a longitudinal bore 240 in which are mounted two roller bearings 241, 242 for a motor shaft 243. Mounted on the shaft 243, by means of a synthetic plastic hub member 245 (FIG. 19) is a carrier member 244 which simultaneously serves for the motor's collector. Carrier member 244 is made of a glass-fiber-reinforced synthetic plastic, e.g. an epoxy-resin, hard-as-glass web, having a thickness of 1.5 mm and laminated on both axial end faces with a thin copper layer of e.g. 17.5 microns, the collector lamellas and the various requisite conductor paths being formed by etching away the portions of the copper layer not required, in a manner described below. On the upper face 246 of the carrier member 244, the individual rotor coils 247, 248 (cf. FIG. 23) are directly secured, at their radially inward portions, by means of cement, e.g. by means of an epoxy resin. In this third embodiment the rotor coils have, as shown, a diameter of about 13 mm and a thickness of about 2.5 mm. The axial moment of inertia of the rotor is determined substantially exclusively by the rotor coils themselves.

Figure 18:
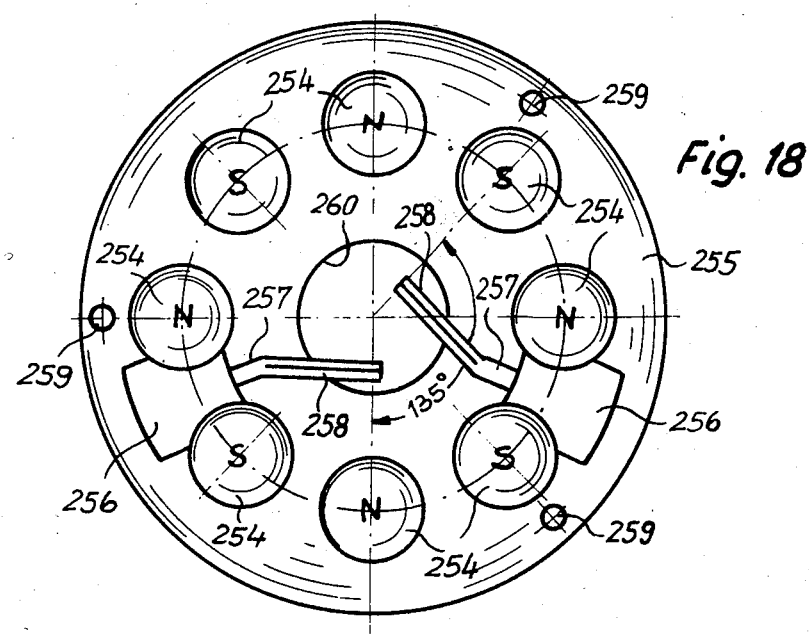
FIG. 18 illustrates in plan view the arrangement of stator magnets and brushes on the yoke plate of the machine of FIG. 17.
Figure 19:
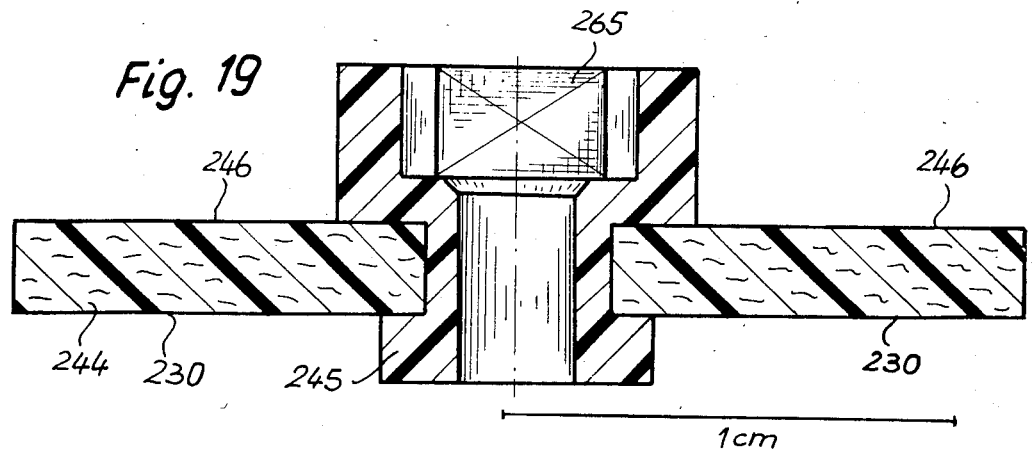
FIG. 19 is a section through an element of the rotor of the machine of FIGS. 17 and 18, such element serving as a carrier member for the rotor coils and for the flat collector.

The rotor coils 247, 248 are provided with a cementing or binding varnish or lacquer imparting shape-retaining properties, and they project radially outward in cantilevered fashion into a flat air gap 253. Air gap 253 is formed by the upper face of a set of eight round permanent magnets 254 of tablet-like shape (having e.g. a diameter of about 6 mm) and, as shown in FIG. 18, these magnets 254 are mounted on an annular yoke plate 255 at equal distances from the rotor axis and at equiangular intervals. The permanent magnets 254 are axially magnetized and have at the sides thereof facing the air gap 253 alternately north and south poles (FIG. 18), forming an eight-pole stator magnet arrangement. The magnets 254 are advantageously samarium-cobalt magnets of high energy density. This makes it possible to dispense with the upper magnet ring 154 employed in the second embodiment, thereby to decrease the axial length of the motor.

Arranged on the yoke plate 255 are two brushes. Their insulated brush holders 256 are, in space-saving manner, each arranged in a respective interspace between two adjoining permanent magnets 254, the two brush holders 256 being angularly spaced by 135° from each other. The brush holders 256 have a shape mating with the outer peripheries of the permanent magnets 254, as shown in FIG. 18. The brush springs per se are angled members: Projecting out from each brush holder 256 is a radial spring portion 257 from which at an angle of about 158° there extends a further portion forming the actual brush 258. The brushes 258 are, as illustrated, longitudinally divided and extend tangential to the aperture 260 on the yoke plate 255. The actual contact locations of the brushes 258, indicated in FIG. 18 by radially extending dash-dot lines at the brush ends, are, in the case of one brush, lined up with a south-pole magnet 254, and in the case of the other brush lined up with a north-pole magnet 254, these two contact locations being spaced by an angular interval of 135°; reference is made to the discussion of angle α in connection with FIG. 2. Yoke plate 255 is provided at its outer rim 255 with centering projections 259, of which one can be seen in sectional view in FIG. 17. Yoke plate 255 has a central aperture 260 through which the free end of shaft 243 projects. This end of shaft 243 is provided with an external thread, onto which is screwed a nut 263. Nut 263, through the intermediary of two dish springs 264, presses the hub member 245 upwardly. Hub member 245 has a flattened portion 265 (FIG. 19) which engages with a corresponding flattened portion 266 of shaft 243 (FIG. 17) to prevent hub member 245 from turning relative to the latter.

A pan-like stator housing 271 is secured by means of screws 270 to the carrier structure 239. The stator housing 271 is made of magnetically conductive material and serves as part of the motor's magnetic-flux circuit. The flat base of the stator housing 271 has a central aperture which is centered on an axial projection 272 of the carrier structure 239. The bottom rim of the peripheral wall of stator housing 271 mounts the yoke plate 255, which latter is held against such rim by the force of magnetic attraction, the marginal projections 259 of yoke plate 255 serving to center the latter with respect to the rim of stator housing 271.

The air gap 253 is accordingly formed between the permanent magnets 254 on the one hand and on the other hand the flat base of the pan-like stator housing 271. The brushes 258 are each provided with a lead 273 which exits the motor downwardly from out the yoke plate 255.

Figure 20:
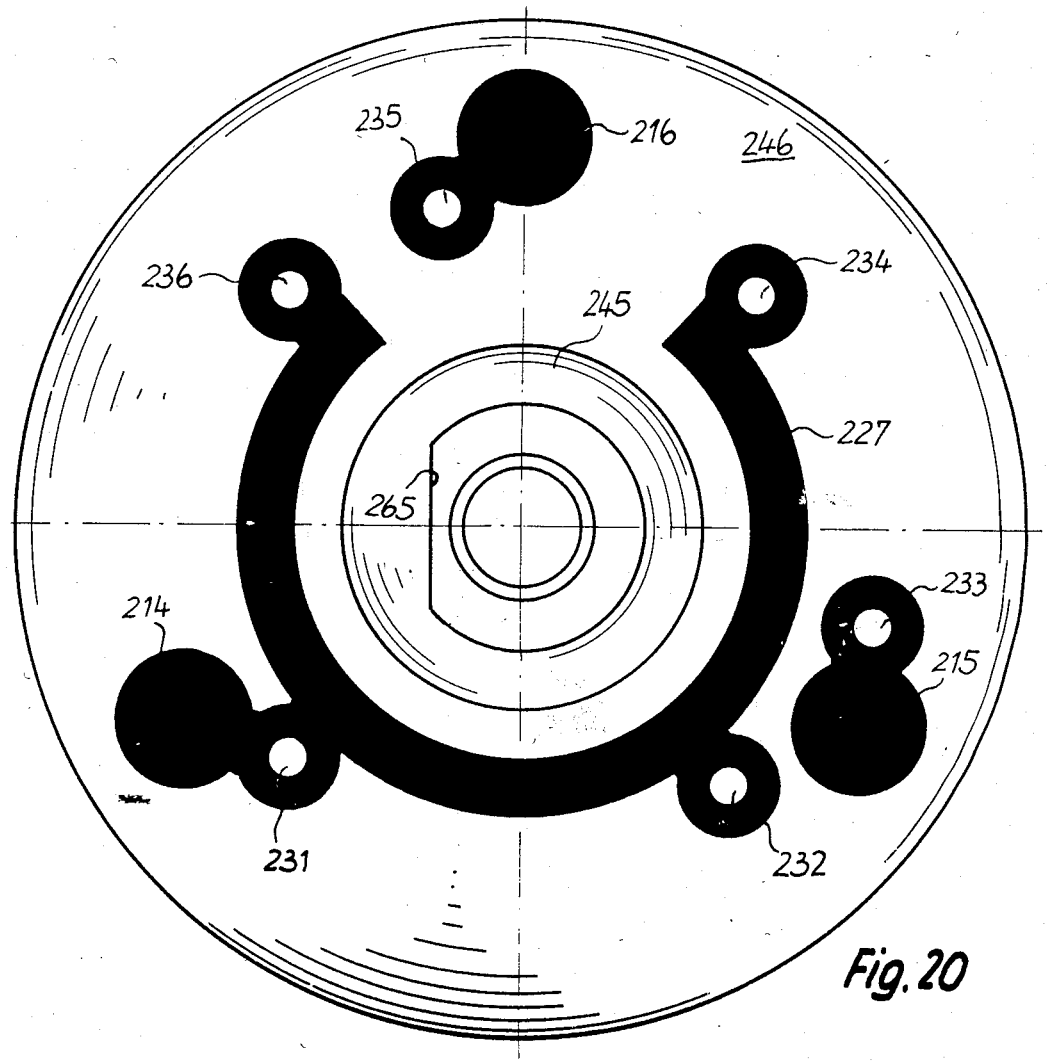
FIG. 20 is a plan view of that face of the element of FIG. 19 on which the rotor coils are to be mounted.
Figure 21:
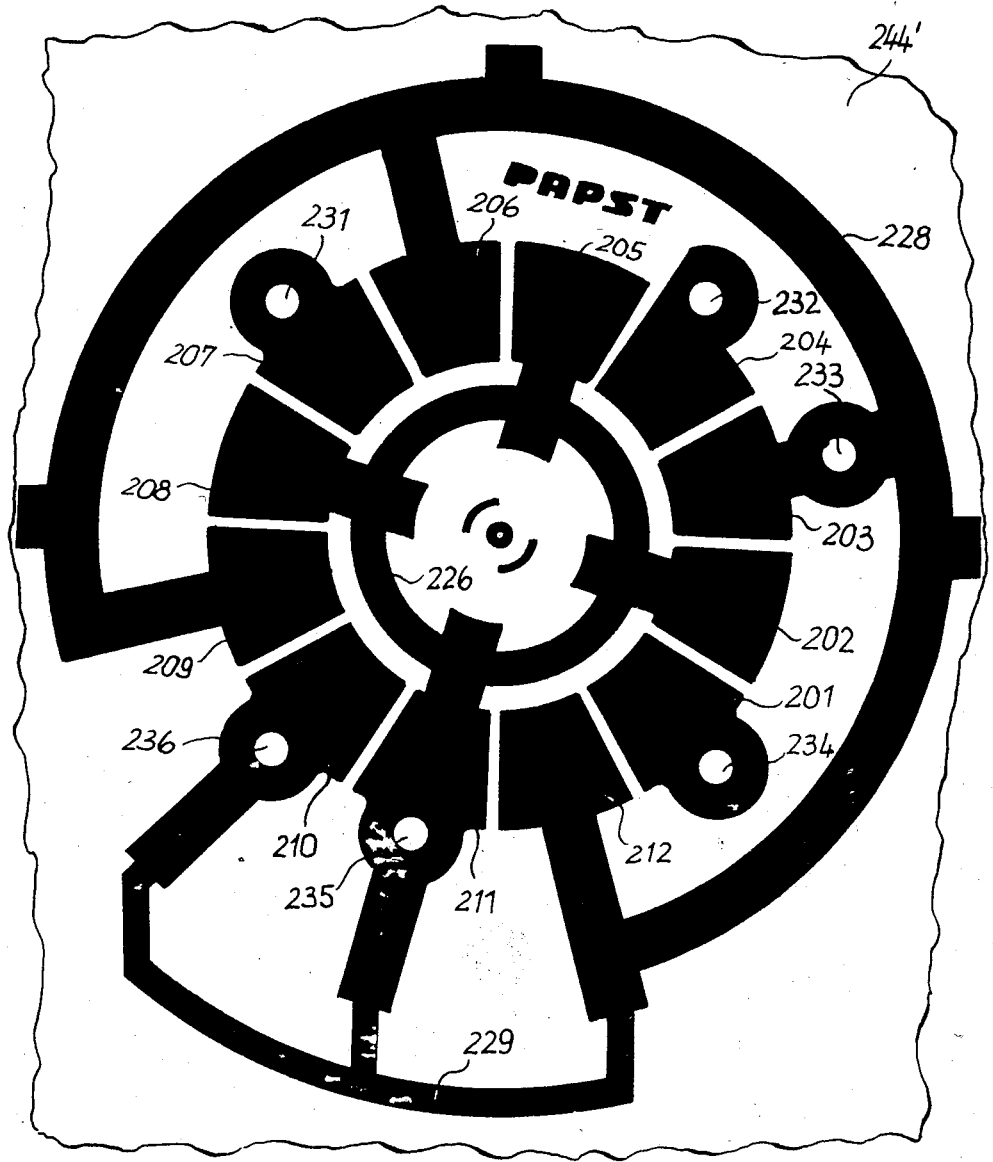
FIG. 21 is a plan view of the flat collector of the motor of FIGS. 17-21, in incompletely fabricated condition.
Figure 22:
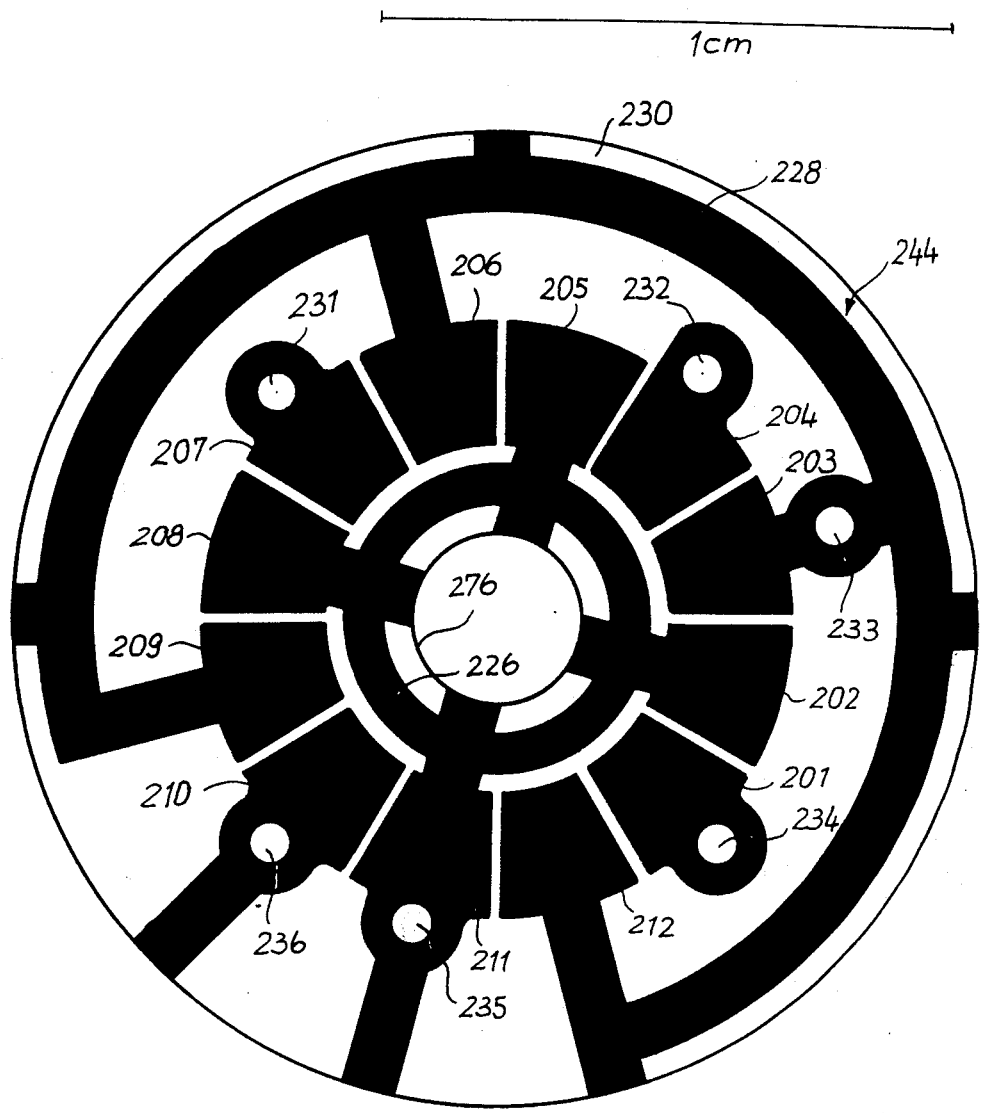
FIG. 22 is a plan view of the flat collector of FIG. 21, in finished condition.

FIGS. 21 and 22 illustrate the fabrication of the collector on the lower axial face 230 of the carrier member 244. As shown in FIG. 21, twelve collector lamellas 201-212 are formed by etching away those portions of a copper coating not needed therefor, the copper coating being provided on a plate 244', plate 244' later being cut to form carrier member 244. In similar fashion there is formed a radially outer cross-connecting means 228 which electrically connects together the four collector lamellas 203, 206, 209, 212, in correspondence to cross-connecting means 28 of FIG. 2. Likewise, by removing the portions of the copper coating not needed, there is formed a radially inner cross-connecting means 226 which electrically connects together the four collector lamellas 202, 205, 208, 211, in correspondence to cross-connecting means 26 of FIG. 2. Lastly, on the reverse face of the plate 244', corresponding to the bottom face 230 of carrier member 244, there is formed as shown in FIG. 20 yet another such cross-connecting means 227 which electrically connects together the collector lamellas 201, 204, 207, 210, corresponding to the cross-connecting means 27 of FIG. 2. Also, as shown in FIG. 21, for purposes of fabrication, there is additionally formed a conductive path 229 connecting together the collector lamellas 210, 211 and 212, and located radially outward of the cross-connecting means 228.

The plate 244' is furthermore provided with six through-conductive circuit holes 231-236 which electrically connect together conductive regions located on opposite faces of the plate 244'. The mechanical apertures of the circuit holes are provided on their inner peripheral walls with a layer of deposited copper, which is continuous with the copper layer surrounding each circuit hole at both faces of the plate 244'. Circuit hole 231 electrically connects lamella 207 with the cross-connecting conductor path 227 and with a soldering land 214 to which the rotor winding 247, 248 will be connected. Circuit hole 232 electrically connects collector lamella 204 with the cross-connecting conductor path 227. Circuit hole 233 electrically connects collector lamella 203 as well as the cross-connecting conductor path 228 to a soldering land 215 to which the rotor winding 247, 248 is to be connected. Circuit hole 234 electrically connects collector lamella 201 to the cross-connecting conductor path 227. Circuit hole 235 electrically connects collector lamella 211 and the cross-connecting conductor path 226 to the soldering land 216 to which the rotor winding 247, 248 is to be connected. Circuit hole 236 electrically connects collector lamella 210 to the cross-connecting conductor path 227.

After production of the circuit holes 231-236 and the electrical through-conductive connections, which conductively connect together the conductive zones surrounding each circuit hole at the two opposite faces of plate 244', i.e., in the state shown in FIG. 21, all conductor paths and lamellas on both faces of the plate 244' are thus now electrically interconnected as required in the final assembly. With the collector plate 244' in this state, firstly the thickness of these metallic components is approximately tripled by galvanic deposition of copper. Then a thin layer of nickel is galvanically deposited atop the copper layer, especially on that side 230 of the plate 244' where the brushes 257, 258 are situated. Thereafter, on that side is galvanically deposited atop the nickel layer a hard gold coating, having a thickness of a few microns, and forming the surface of the collector upon which the brushes actually ride. Finally, the carrier member 244 (see FIG. 22) is stamped out from the preliminary plate 244' and provided with a central aperture 276, into which the hub member 245 (see FIG. 20) is then provided, e.g. by an injection-molding process. As a consequence of such stamping out of the final carrier member 244, the conductor path 229, needed for the aforementioned galvanic deposition steps, is removed, and the three cross-connecting conductor paths 226, 227, 228 become electrically discontinuous from one another.

Figure 17:
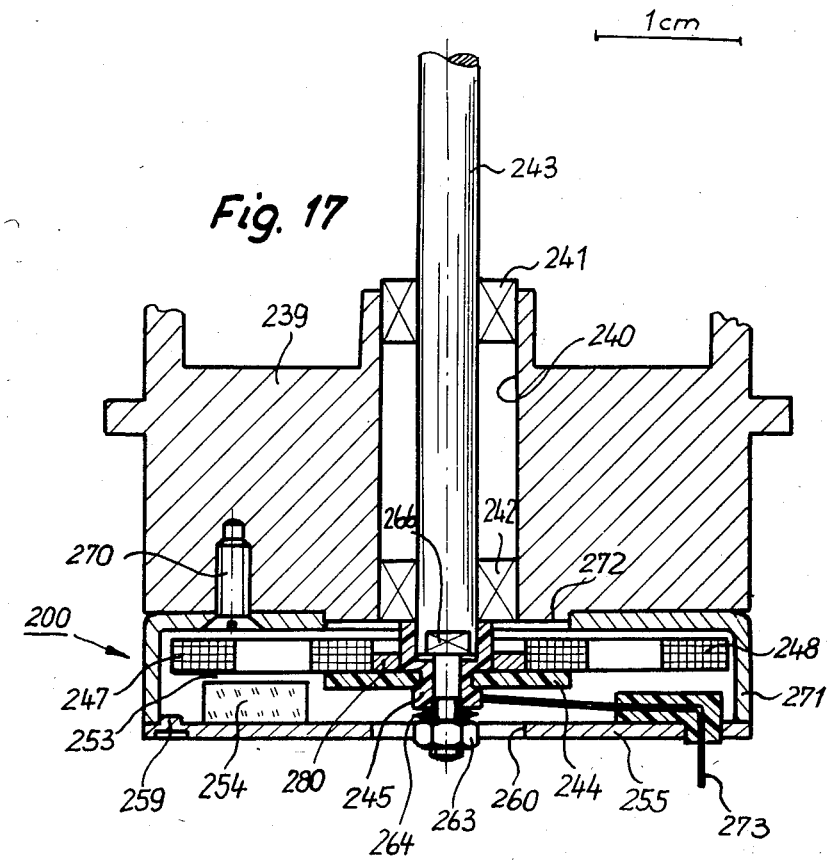
FIG. 17 is a longitudinal section, like that of FIG. 4 or 11, through a third embodiment of an inventive collector-type D.C. machine, on a larger than true scale.
Figure 23:
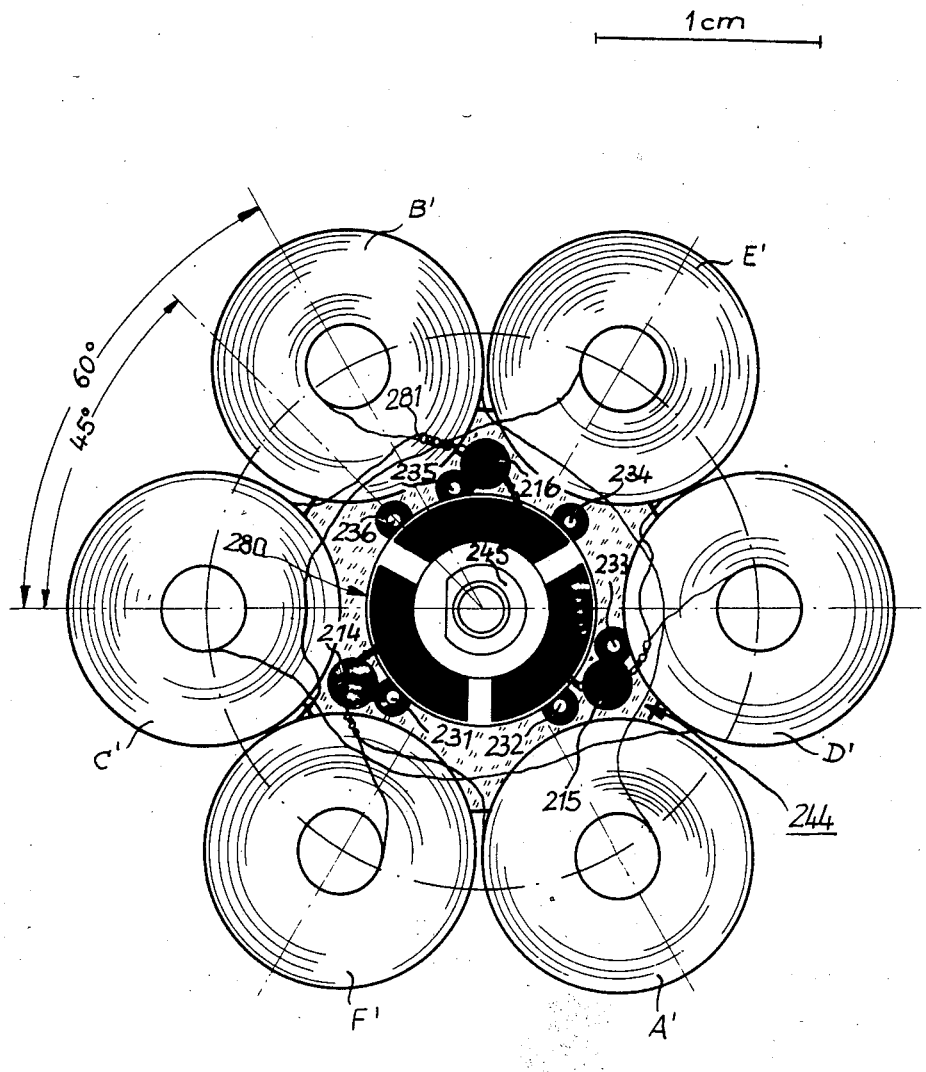
FIG. 23 is a plan view of the carrier member of FIG. 19 and, mounted thereon, six equiangularly spaced rotor coils, as well as the connections of the rotor coils to the collector and to an anti-interference circuit module.

FIG. 23 depicts the carrier member 244 with six rotor coils secured at its upper face 246. These coils, denoted 247 and 248 in FIG. 17, are in FIG. 23 denoted A'-E' in correspondence to the description of FIGS. 1 and 3. Starting clockwise from the 1-o'clock position in FIG. 23, the sequence of rotor coils is E', D', A', F', C', B'. These circular coils A'-E' are, in exactly the same way as in FIG. 3, constituted by a single, uninterrupted conductor and provided with similar connection points for connection to collector lamella groups. The connections between individual coils are expressly depicted in FIG. 23, as is the winding sense of the coils.

Specifically:

The coils A' and B' are connected in series with each other between the soldering lands 216 and 214, i.e., between the cross-connecting conductor paths 226 and 227.

The coils C' and D' are connected in series with each other between the soldering lands 216 and 215, i.e., between the cross-connecting conductor paths 226 and 228.

The coils E' and F' are connected in series with each other between the soldering lands 215 and 214, i.e. between the cross-connecting conductor paths 228 and 227.

Further provided is a capacitor module 280 accommodating three delta-connected capacitors which serve to suppress interference effects. Module 280 is electrically insulating at its underface, at which face it is secured to the carrier member 244, e.g., by cementing. The upper face of module 280 is provided with three soldering lands, to which, as illustrated, the three connecting points from the three delta-connected coil-pairs A'-B', C'-D', E'-F' are respectively soldered. For example, the connection point 281 between the coils B' and C' extends out to the soldering land 216, is soldered to it, and from there extends to the top one of the three soldering lands on the upper face of capacitor module 280, being soldered to the top land. The two other connection points are analogously connected, and their connections expressly shown in FIG. 23. The circuit depiction of the connection of the three capacitors to the rotor coils and the collector lamellas is the same as in FIG. 2.

The motor of this third embodiment constitutes a particularly small variant of the invention, especially suitable for use in battery-powered video recorders, for which application low motor weight is of special importance. Self-evidently, however, the motor of the third embodiment is not limited to such application, nor to the stated dimensions, voltages, etc. In comparison to the motor of the first embodiment, that of the third embodiment has a somewhat inferior efficiency; however, its dimensions are a fraction of those of the motor of the first embodiment and its power about the same. It will be apparent that the form of construction exhibited by the third embodiment is equally applicable to motors where the number of rotor coils, stator poles and/or collector lamellas differs from those illustrated, merely for example as shown in Federal Republic of Germany Offenlegungsschrift No. DE-OS 32 17 283, the disclosure of which is incorporated by reference. Thus, the structural features exhibited in this third disclosed embodiment of the present invention are to be considered of inventive significance per se.

It will be understood that each of the elements described above, or two or more together, may also find a useful application in other types of constructions and fabrication procedures differing from the types described above.

While the invention has been illustrated and described as embodied in flat-air-gap motors having stated numbers of stator poles, rotor coils and collector lamellas, as well as procedures for their fabrication, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:
1. A direct-current machine comprising
a stator including an eight-pole stator magnet arrangement;
a six-coil ironless rotor arrangement mounted for rotation about a rotor axis, and including six coils arranged in a single winding layer at equiangular intervals about the rotor axis,
the rotor arrangement furthermore including a collector arrangement having twelve collector lamellas arranged in a circle about the rotor axis, the angular spacing between corresponding points of successive lamellas accordingly being substantially 30 mechanical degrees, the twelve collector lamellas consisting of first, second and third collector lamella groups, each collector lamella group consisting of a respective four collector lamellas spaced one from the next at angular intervals of 90 mechanical degrees,
means for transmitting current to and from the collector lamellas and for electrically connecting together respective collector lamellas, said means including first and second brush arrangements on the stator electrically engaging collector lamellas and angularly offset from each other by about $45+(n\times 90)$ mechanical degrees, wherein $n=0$, 1, 2 or 3, said means furthermore including cross-connecting means operative for causing the four collector lamellas of respective collector lamella groups to be electrically connected together as successive collector lamella groups are electrically engaged by the first and second brush arrangements,
the six coils consisting of first, second and third coil-pairs, each coil-pair being constituted by two coils located diametrically opposite to each other with respect to the rotor axis,
the two coils of each coil-pair being electrically connected together for simultaneous energization and simultaneous deenergization,
the first, second and third coil-pairs being, respectively, electrically connected between collector lamellas of the first and second collector lamella groups, between collector lamellas of the second and third collector lamella groups, and between collector lamellas of the third and first collector lamella groups,
the two coils of each coil-pair being connected in series with each other,
said six coils being constituted by conductor means wound without interruption from one coil to the next in such a manner that the conductor means is continuously wound to form the two coils of the first coil-pair, thereupon extends without interruption to form the continuously wound two coils of the second coil-pair and thereupon extends without interruption to form the continuously wound two coils of the third coil-pair.
2. A direct-current machine comprising
a stator including an eight-pole stator magnet arrangement;
a six-coil ironless rotor arrangement mounted for rotation about a rotor axis, and including six coils arranged in a single winding layer at equiangular intervals about the rotor axis,
the rotor arrangement furthermore including a collector arrangement having twelve collector lamellas arranged in a circle about the rotor axis, the angular spacing between corresponding points of successive lamellas accordingly being substantially 30 mechanical degrees, the twelve collector lamellas consisting of first, second and third collector lamella groups, each collector lamella group consisting of a respective four collector lamellas spaced one from the next at angular intervals of 90 mechanical degrees,
means for transmitting current to and from the collector lamellas and for electrically connecting together respective collector lamellas, said means including first and second brush arrangements on the stator electrically engaging collector lamellas and angularly offset from each other by about $45+(n\times 90)$ mechanical degrees, wherein $n=0$, 1, 2 or 3, said means furthermore including cross-connecting means operative for causing the four collector lamellas of respective collector lamella groups to be electrically connected together as successive collector lamella groups are electrically engaged by the first and second brush arrangements,
the six coils consisting of first, second and third coil-pairs, each coil-pair being constituted by two coils located diametrically opposite to each other with respect to the rotor axis, the two coils of each coil-pair being electrically connected together for simultaneous energization and simultaneos deenergization, the first, second and third coil-pairs being, respectively, electrically connected between collector lamellas of the first and second collector lamella groups, between collector lamellas of the second and third collector lamella groups, and between collector lamellas of the third and first collector lamella groups, said cross-connecting means comprising first, second and third cross-connecting means provided on the rotor arrangement, each cross-connecting means permanently electrically connecting together the four collector lamellas of a respective one of said first, second and third collector lamella groups, one of said cross-connecting means and the four collector lamellas connected by the latter being respective parts of a one-piece body of electrically conductive material.

3. A direct-current machine comprising a stator including an eight-pole stator magnet arrangement;

a six-coil ironless rotor arrangement mounted for rotation about a rotor axis, and including six coils arranged in a single winding layer at equiangular intervals about the rotor axis, the rotor arrangement furthermore including a collector arrangement having twelve collector lamellas arranged in a circle about the rotor axis, the angular spacing between corresponding points of successive lamellas accordingly being substantially 30 mechanical degrees, the twelve collector lamellas consisting of first, second and third collector lamella groups, each collector lamella group consisting of a respective four collector lamellas spaced one from the next at angular intervals of 90 mechanical degrees, means for transmitting current to and from the collector lamellas and for electrically connecting together respective collector lamellas, said means including first and second brush arrangements on the stator electrically engaging collector lamellas and angularly offset from each other by about $45+(n \times 90)$ mechanical degrees, wherein $n=0, 1, 2$ or $3$, said means furthermore including cross-connecting means operative for causing the four collector lamellas of respective collector lamella groups to be electrically connected together as successive collector lamella groups are electrically engaged by the first and second brush arrangements, the six coils consisting of first, second and third coil-pairs, each coil-pair being constituted by two coils located diametrically opposite to each other with respect to the rotor axis, the two coils of each coil-pair being electrically connected together for simultaneous energization and simultaneous deenergization, the first, second and third coil-pairs being, respectively, electrically connected between collector lamellas of the first and second collector lamella groups, between collector lamellas of the second and third collector lamella groups, and between collector lamellas of the third and first collector lamella groups, said cross-connecting means comprising first, second and third cross-connecting means provided on the rotor arrangement, each cross-connecting means permanently electrically connecting together the four collector lamellas of a respective one of said first, second and third collector lamella groups, one of said cross-connecting means being spatially located to one respective side of the twelve collector lamellas, another of said cross-connecting means being spatially located to an opposite respective side of said collector lamellas.

4. A direct-current machine comprising a stator including an eight-pole stator magnet arrangement;

a six-coil ironless rotor arrangement mounted for rotation about a rotor axis, and including six coils arranged in a single winding layer at equiangular intervals about the rotor axis, the rotor arrangement furthermore including a collector arrangement having twelve collector lamellas arranged in a circle about the rotor axis, the angular spacing between corresponding points of successive lamellas accordingly being substantially 30 mechanical degrees, the twelve collector lamellas consisting of first, second and third collector lamella groups, each collector lamella group consisting of a respective four collector lamellas spaced one from the next at angular intervals of 90 mechanical degrees, means for transmitting current to and from the collector lamellas and for electrically connecting together respective collector lamellas, said means including first and second brush arrangements on the stator electrically engaging collector lamellas and angularly offset from each other by about $45+(n \times 90)$ mechanical degrees, wherein $n=0, 1, 2$ or $3$, said means furthermore including cross-connecting means operative for causing the four collector lamellas of respective collector lamella groups to be electrically connected together as successive collector lamella groups are electrically engaged by the first and second brush arrangements, the six coils consisting of first, second and third coil-pairs, each coil-pair being constituted by two coils located diametrically opposite to each other with respect to the rotor axis, the two coils of each coil-pair being electrically connected together for simultaneous energization and simultaneous deenergization, the first, second and third coil-pairs being, respectively, electrically connected between collector lamellas of the first and second collector lamella groups, between collector lamellas of the second and third collector lamella groups, and between collector lamellas of the third and first collector lamella groups, said cross-connecting means comprising first, second and third cross-connecting means provided on the rotor arrangement, each cross-connecting means permanently electrically connecting together the four collector lamellas of a respective one of said first, second and third collector lamella groups, said collector arrangement being generally planar and including a mounting hub of electrically insulating material for mounting the collector arrangement on the rotor arrangement, one of said cross-connecting means being at least in part located within the mounting hub.

5. A direct-current machine as defined in claim 1, the uninterruptedly extending conductor means which constitutes the six coils including transitional portions, the transitional portions of the conductor means extending from a coil of one coil-pair to a coil of an adjoining coil-pair, the transitional portions extending first from a coil of one coil pair to a respective connection point and then from such connecting point to a coil of an adjoining coil pair, the thusly formed connection points being electrically connected to collector lamellas of respective collector lamella groups.

6. A direct-current machine as defined in claim 5, said transitional portions of said conductor means being inter-coil-pair transitional portions, said uninterruptedly extending conductor means furthermore including inter-coil transitional portions, the inter-coil transitional portions extending from one coil of a respective coil pair to the other coil of the coil pair, the inter-coil transitional portions of the conductor means extending greater distances than do the inter-coil-pair transitional portions of the conductor means.

7. A direct-current machine as defined in claim 6, the coils comprising a cementing or binding lacquer or varnish causing the coils to be inherently shape-retaining.

8. A direct-current machine as defined in claim 7, the rotor arrangement including means mounting the coils on the rotor arrangement and mechanically supporting the coils only at portions thereof, the remaining portions of the coils extending in free space and being self-supporting due to their shape-retaining characteristic.

9. A direct-current machine as defined in claim 5, each coil being at least approximately symmetrical with regard to a respective symmetry plane passing through the rotor axis, said connection points being spatially located near to respective coils but angularly offset relative to the symmetry planes of the respective coils.

10. A direct-current machine as defined in claim 1, the stator magnet arrangement being of a geometry such as to form a planar air gap through which the stator field of the machine passes, the rotor arrangement including mounting means mounting said coils on the rotor arrangement, the mounting means being mechanically connected to and supporting the coils at the portions of the coils located closest to the rotor axis with the coils extending radially outwardly therefrom in cantilevered fashion into the stator field in the planar air gap.

11. A direct-current machine as defined in claim 10, the machine having a rotor shaft, the mounting means comprising a carrier structure having a generally radially extending portion supporting the coils and an axially extending portion secured to the rotor shaft, the collector arrangement being supported on the axially extending portion of the carrier structure.

12. A direct-current machine as defined in claim 1, the stator magnet arrangement being of a geometry such as to form a planar air gap and including two stator magnet arrangements located at opposite axial sides of the planar air gap, the rotor arrangement including mounting means mounting said coils on the rotor arrangement, the coils extending radially outwardly into said planar air gap.

13. A direct-current machine as defined in claim 12, the mounting means being of generally hexagonal outline when viewed in the direction of the rotor axis and having six corner portions, the coils being secured to the mounting means at respective ones of the corner portions.

14. A direct-current machine as defined in claim 1, the collector arrangement being generally planar and comprising a substrate of electrically insulating material and thereon a partly etched away thin metallic layer whose remaining portions include portions forming said collector lamellas.

15. A direct-current machine as defined in claim 1, the stator magnet arrangement comprising a circular succession of discrete stator magnets, successive ones of the discrete stator magnets being of alternate polarity and being spaced from one another by interspaces, said brush arrangements comprising brushes and brush holders holding the brushes, the brush holders being located in interspaces between discrete magnets of the stator.

16. A direct-current machine as defined in claim 15, the stator magnet arrangement comprising at least one samarium-cobalt magnet.

17. A direct-current machine as defined in claim 15, the stator magnet arrangement comprising a circular succession of discrete samarium-cobalt magnets, successive ones of the discrete magnets being of alternate polarity.

18. A direct-current machine comprising
a stator including an eight-pole stator magnet arrangement;
a six-coil ironless rotor arrangement mounted for rotation about a rotor axis, and including six coils arranged in a single winding layer at equiangular intervals about the rotor axis,
the rotor arrangement furthermore including a collector arrangement having twelve collector lamellas arranged in a circle about the rotor axis, the angular spacing between corresponding points of successive lamellas accordingly being substantially 30 mechanical degrees, the twelve collector lamellas consisting of first, second and third collector lamella groups, each collector lamella group consisting of a respective four collector lamellas spaced one from the next at angular intervals of 90 mechanical degrees,
means for transmitting current to and from the collector lamellas and for electrically connecting together respective collector lamellas, said means including first and second brush arrangements on the stator electrically engaging collector lamellas and angularly offset from each other by about $45 + (n \times 90)$ mechanical degrees, wherein $n = 0, 1, 2,$ or $3$, said means furthermore including cross-connecting means operative for causing the four collector lamellas of respective collector lamella groups to be electrically connected together as successive collector lamella groups are electrically engaged by the first and second brush arrangements,
the six coils consisting of first, second and third coil-pairs, each coil-pair being constituted by two coils located diametrically opposite to each other with respect to the rotor axis,
the two coils of each coil-pair being electrically connected together for simultaneous energization and simultaneous deenergization,
the first, second and third coil-pairs being, respectively, electrically connected between collector lamellas of the first and second collector lamella groups, between collector lamellas of the second and third collector lamella groups, and between collector lamellas of the third and first collector lamella groups, said cross-connecting means comprising first, second and third cross-connecting means provided on the rotor arrangement, each cross-connecting means permanently electrically connecting together the four collector lamellas of a respective one of said first, second and third collector lamella groups, said collector arrangement being generally planar, said first, second and third cross-connecting means being formed by respective portions of electrically conductive material provided on said generally planar collector arrangement, the electrically conductive material of said first, second and third cross-connecting means including respective first, second and third contact portions projecting out from the general plane of the collector arrangement, said rotor arrangement furthermore including an anti-interference circuit module containing anti-inference circuit components, the anti-interference circuit module being electrically engaged by said first, second and third contact portions.

19. A direct-current machine as defined in claim 18, one of said first, second and third cross-connecting means including a discrete electrically conductive member electrically connected to the lamellas of a respective collector group and so shaped as to form a spring member which keeps said anti-interference module in a position electrically engaged by said contact portions.

20. A direct-current machine as defined in claim 19, said discrete electrically conductive member being of a shape including four equiangularly spaced spoke-like portions each of which is in direct electrical engagement with a respective one of the four lamellas of the respective collector lamella group.

21. A direct-current machine comprising
a stator including an eight-pole stator magnet arrangement;
a six-coil ironless rotor arrangement mounted for rotation about a rotor axis, and including six coils arranged in a single winding layer at equiangular intervals about the rotor axis,
the rotor arrangement furthermore including a collector arrangement having twelve collector lamellas arranged in a circle about the rotor axis, the angular spacing between corresponding points of successive lamellas accordingly being substantially 30 mechanical degrees, the twelve collector lamellas consisting of first, second and third collector lamella groups, each collector lamella group consisting of a respective four collector lamellas spaced one from the next at angular intervals of 90 mechanical degrees,
means for transmitting current to and from the collector lamellas and for electrically connecting together respective collector lamellas, said means including first and second brush arrangements on the stator electrically engaging collector lamellas and angularly offset from each other by about $45+(n\times 90)$ mechanical degrees, wherein $n=0, 1, 2$ or 3, said means furthermore including cross-connecting means operative for causing the four collector lamellas of respective collector lamella groups to be electrically connected together as successive collector lamella groups are electrically engaged by the first and second brush arrangements,
the six coils consisting of first, second and third coil-pairs, each coil-pair being constituted by two coils located diametrically opposite to each other with respect to the rotor axis,
the two coils of each coil-pair being electrically connected together for simultaneous energization and simultaneous deenergization,
the first, second and third coil-pairs being, respectively, electrically connected between collector lamellas of the first and second collector lamella groups, between collector lamellas of the second and third collector lamella groups, and between collector lamellas of the third and first collector lamella groups,
said cross-connecting means comprising first, second and third cross-connecting means provided on the rotor arrangement, each cross-connecting means permanently electrically connecting together the four collector lamellas of a respective one of said first, second and third collector lamella groups,
the collector arrangement being generally planar and comprising a substrate of electrically insulating material and thereon a partly etched away thin metallic layer whose remaining portions include portions which form said collector lamellas and at least one of said cross-connecting means.

22. A direct-current machine comprising
a stator including an eight-pole stator magnet arrangement;
a six-coil ironless rotor arrangement mounted for rotation about a rotor axis, and including six coils arranged in a single winding layer at equiangular intervals about the rotor axis,
the rotor arrangement furthermore including a collector arrangement having twelve collector lamellas arranged in a circle about the rotor axis, the angular spacing between corresponding points of successive lamellas accordingly being substantially 30 mechanical degrees, the twelve collector lamellas consisting of first, second and third collector lamella groups, each collector lamella group consisting of a respective four collector lamellas spaced one from the next at angular intervals of 90 mechanical degrees,
means for transmitting current to and from the collector lamellas and for electrically connecting together respective collector lamellas, said means including first and second brush arrangements on the stator electrically engaging collector lamellas and angularly offset from each other by about $45+(n\times 90)$ mechanical degrees, wherein $n=0, 1, 2$ or 3, said means furthermore including cross-connecting means operative for causing the four collector lamellas of respective collector lamella groups to be electrically connected together as successive collector lamella groups are electrically engaged by the first and second brush arrangements,
the six coils consisting of first, second and third coil-pairs, each coil-pair being constituted by two coils located diametrically opposite to each other with respect to the rotor axis,
the two coils of each coil-pair being electrically connected together for simultaneous energization and simultaneous deenergization, the first, second and third coil-pairs being, respectively, electrically connected between collector lamellas of the first and second collector lamella groups, between collector lamellas of the second and third collector lamella groups, and between collector lamellas of the third and first collector lamella groups, said cross-connecting means comprising first, second and third cross-connecting means provided on the rotor arrangement, each cross-connecting means permanently electrically connecting together the four collector lamellas of a respective one of said first, second and third collector lamella groups, the collector arrangement being generally planar and comprising a substrate of electrically insulating material having two major faces and on one face a partly etched away thin metallic layer whose remaining portions include portions which form said collector lamellas and on its other face a partly etched away thin metallic layer whose remaining portions include portions which form one of said cross-connecting means, the portions of the thin metallic layers which form said cross-connecting means and the collector lamellas to which said cross-connecting means is electrically connected including registering through-conductive circuit holes on the two faces of the substrate.

23. A direct-current machine comprising
a stator including an eight-pole stator magnet arrangement;
a six-coil ironless rotor arrangement mounted for rotation about a rotor axis, and including six coils arranged in a single winding layer at equiangular intervals about the rotor axis,
the rotor arrangement furthermore including a collector arrangement having twelve collector lamellas arranged in a circle about the rotor axis, the angular spacing between corresponding points of successive lamellas accordingly being substantially 30 mechanical degrees, the twelve collector lamellas consisting of first, second and third collector lamella groups, each collector lamella group consisting of a respective four collector lamellas spaced one from the next at angular intervals of 90 mechanical degrees,
means for transmitting current to and from the collector lamellas and for electrically connecting together respective collector lamellas, said means including first and second brush arrangements on the stator electrically engaging collector lamellas and angularly offset from each other by about $45+(n\times 90)$ mechanical degrees, wherein $n=0, 1, 2$ or 3, said means furthermore including cross-connecting means operative for causing the four collector lamellas of respective collector lamella groups to be electrically connected together as successive collector lamella groups are electrically engaged by the first and second brush arrangements, the six coils consisting of first, second and third coil-pairs, each coil-pair being constituted by two coils located diametrically opposite to each other with respect to the rotor axis, the two coils of each coil-pair being electrically connected together for simultaneous energization and simultaneous deenergization, the first, second and third coil-pairs being, respectively, electrically connected between collector lamellas of the first and second collector lamella groups, between collector lamellas of the second and third collector lamella groups, and between collector lamellas of the third and first collector lamella groups, said cross-connecting means comprising first, second and third cross-connecting means provided on the rotor arrangement, each cross-connecting means permanently electrically connecting together the four collector lamellas of a respective one of said first, second and third collector lamella groups, the collector arrangement being generally planar and comprising a substrate of electrically insulating material having two major faces and on one face a partly etched away thin metallic layer whose remaining portions include portions which form said collector lamellas and on its other face a partly etched away thin metallic layer whose remaining portions include portions which form conductive connecting portions electrically connected to the collector lamellas on said one face of the substrate, the first, second and third coil-pairs being electrically connected to the conductive connecting portions on said other face of the substrate and thereby being electrically connected to the collector lamellas on said one face of the substrate.

24. A direct-current machine as defined in claim 23, said first, second and third coil-pairs being furthermore mechanically mounted on said other face of the substrate.

25. A direct-current machine as defined in claim 3, said one of said cross-connecting means and the four collector lamellas connected thereby being respective parts of a one-piece body of electrically conductive material, said other of said cross-connecting means and the four collector lamellas connected thereby being respective parts of another one-piece body of electrically conductive material.

* * * * *